US008659599B2

(12) United States Patent
Carr et al.

(10) Patent No.: US 8,659,599 B2
(45) Date of Patent: Feb. 25, 2014

(54) SYSTEM AND METHOD FOR GENERATING A MANIFOLD SURFACE FOR A 3D MODEL OF AN OBJECT USING 3D CURVES OF THE OBJECT

(75) Inventors: Nathan A. Carr, San Jose, CA (US); Lu Liu, Clayton, MO (US)

(73) Assignee: Adobe Systems Incorporated, San Jose, CA (US)

(*) Notice: Subject to any disclaimer, the term of this patent is extended or adjusted under 35 U.S.C. 154(b) by 600 days.

(21) Appl. No.: 12/956,762

(22) Filed: Nov. 30, 2010

(65) Prior Publication Data

US 2013/0127857 A1     May 23, 2013

Related U.S. Application Data

(60) Provisional application No. 61/377,811, filed on Aug. 27, 2010.

(51) Int. Cl.
*G06T 17/20*     (2006.01)

(52) U.S. Cl.
USPC ..................................................... 345/423

(58) Field of Classification Search
USPC ..................................................... 345/423
See application file for complete search history.

(56) References Cited

U.S. PATENT DOCUMENTS

| | | | |
|---|---|---|---|
| 6,731,280 B1 * | 5/2004 | Koelman | 345/420 |
| 7,932,904 B2 * | 4/2011 | Branets et al. | 345/423 |

OTHER PUBLICATIONS

Amenta, N., Bern, M., and Kamvysselis, M. 1998. A new voronoi-based surface reconstruction algorithm. In SIGGRAPH '98: Proceedings of the 25th annual conference on Computer graphics and interactive techniques, ACM, New York, NY, USA, ACM, 415-421, Sep. 1998.

Amenta, N., Attali, D., and Devillers, O. 2007. Complexity of delaunay triangulation for points on lower-dimensional polyhedra. In SODA '07: Proceedings of the eighteenth annual ACM-SIAM symposium on Discrete algorithms, Society for Industrial and Applied Mathematics, Philadelphia, PA, USA, Society for Industrial and Applied Mathematics, 1106-1113, Jan. 2007.

Bae, S.-H., Balakrishnan, R., and Singh, K. 2008. Ilovesketch: as-natural-as-possible sketching system for creating 3d curve models. In UIST, ACM, 151-160, Oct. 2008.

(Continued)

*Primary Examiner* — Edward Martello
(74) *Attorney, Agent, or Firm* — Wolfe-SBMC

(57) ABSTRACT

Various embodiments of a system and methods for generating a manifold surface of an object from a set of 3D curves which define the shape of the object are described. The set of 3D curves may be directly tessellated in the 3D domain to form a manifold surface with boundary. The tessellation may be a Delaunay tetrahedralization which represents the set of 3D curves. The surface of the tetrahedralization may contain a set of possible manifold surface solutions. A dual complex form of the tetrahedralization may be generated to reduce the number of possible manifold surface solutions. Surface patches may be generated from the dual complex form, dependent on a set of metrics that may further reduce the number of possible manifold surface solutions. Compatible surface patches may be combined to form a set of possible manifold surface solutions which may be displayed to a user.

20 Claims, 14 Drawing Sheets

(56) References Cited

OTHER PUBLICATIONS

Joshi, P., and Carr, N. A. 2008. Repouss'e: Automatic inflation of 2d vector art. In SBIM '08: Proceedings of the sixth Eurographics workshop on Sketch-Based Interfaces and Modeling, Eurographics Association, Aire-la-Ville, Switzerland, Switzerland, Eurographics, 49-56, Jun. 2008.

L'E Vy, B. 2003. Dual domain extrapolation. ACM Transactions on Graphics (SIGGRAPH conference proceedings) 22, 3 (Jul), 364-369. SIGGRAPH 2003 Session : Parameterization.

Liu, L., Bajaj, C., Deasy, J. O., Low, D. A., and Ju, T. 2008. Surface reconstruction from non-parallel curve networks. Computer Graphics Forum 27, 2 (Apr.), 155-163.

Nealen, A., Igarashi, T., Sorkine, O., and Alexa, M. 2007. Fibermesh: designing freeform surfaces with 3d curves. ACM Trans. Graph. 26, 3, 41, Jul. 2007.

Prasad, L. 1997. Morphological analysis of shapes. CNLS Newsletter 139, 1-18, Jul. 1997.

Si, H., 2009. Tetgen:a quality tetrahedral mesh generator and a 3d delaunay triangulator, 3 pages, Sep. 2009.

Tenenbaum, J. B., Silva, V., and Langford, J. C. 2000. A Global Geometric Framework for Nonlinear Dimensionality Reduction. Science 290, 5500, 2319-2323, Dec. 2000.

Zhao, W., Gao, S., and Lin, H. 2007. A robust hole-filling algorithm for triangular mesh. The Visual Computer 23, 987-997. 10.1007/s00371-007-0167-y, Aug. 2007.

Rose, et al., Developable Surfaces from Arbitrary Sketched Boundaries, Eurographics Symposium on Geometry Processing, 2007, 1 page.

\* cited by examiner

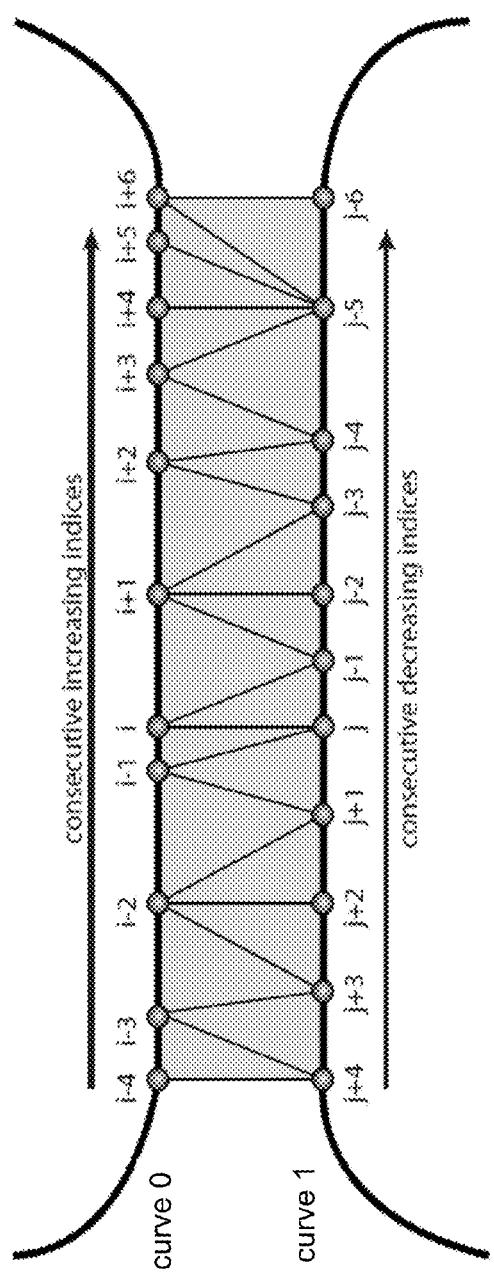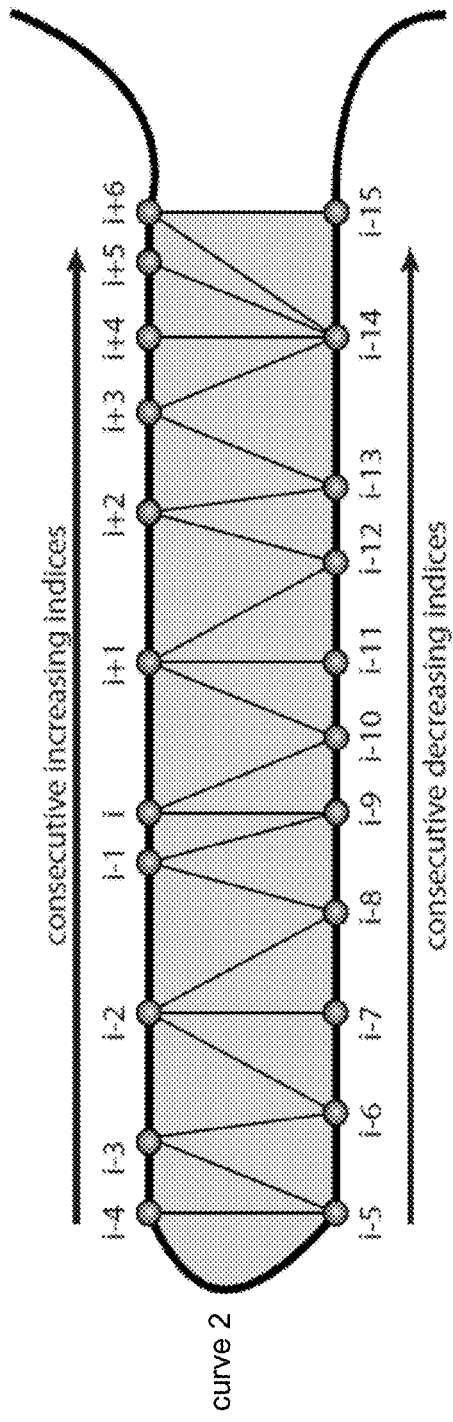
FIG. 5A
FIG. 5B

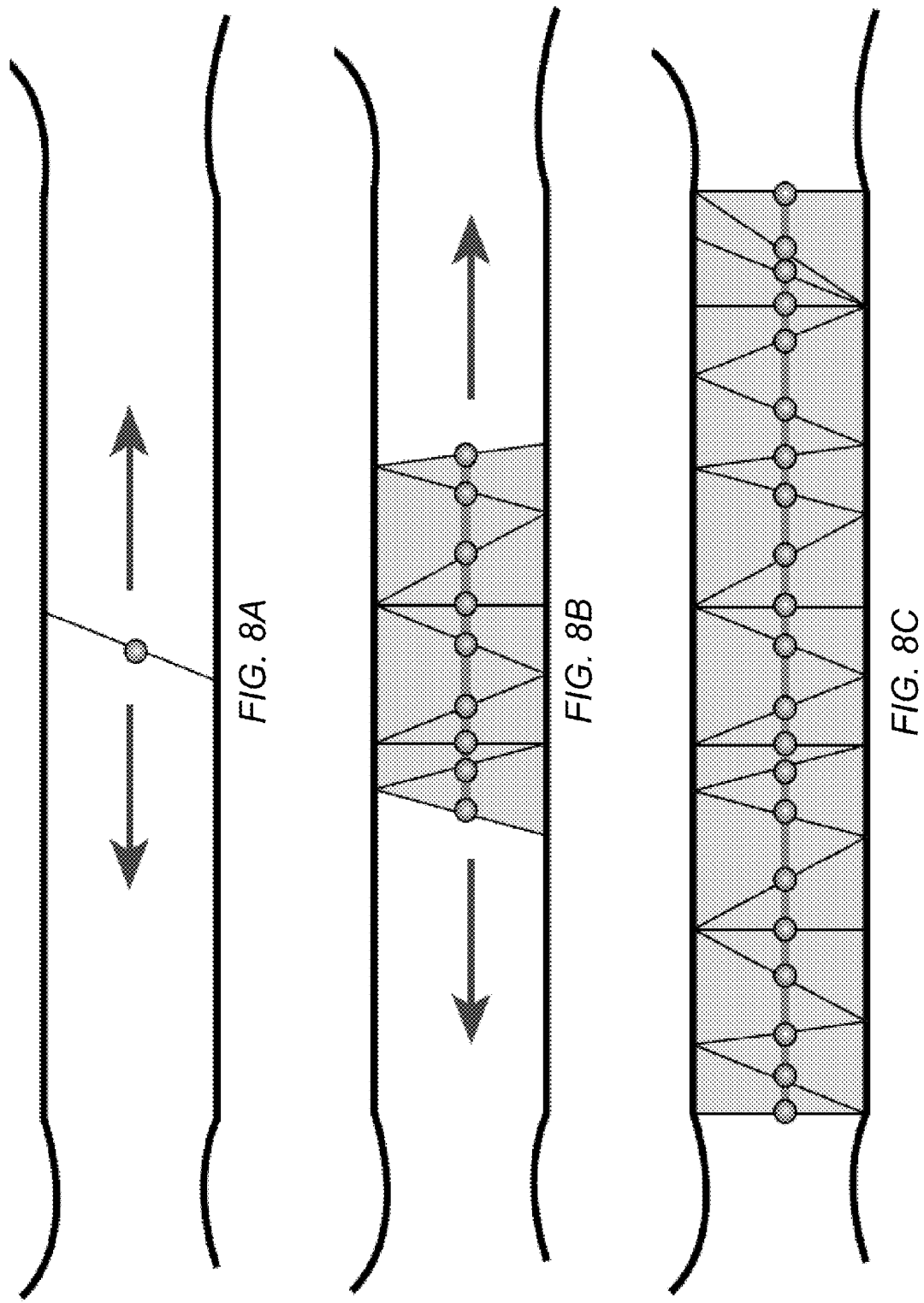

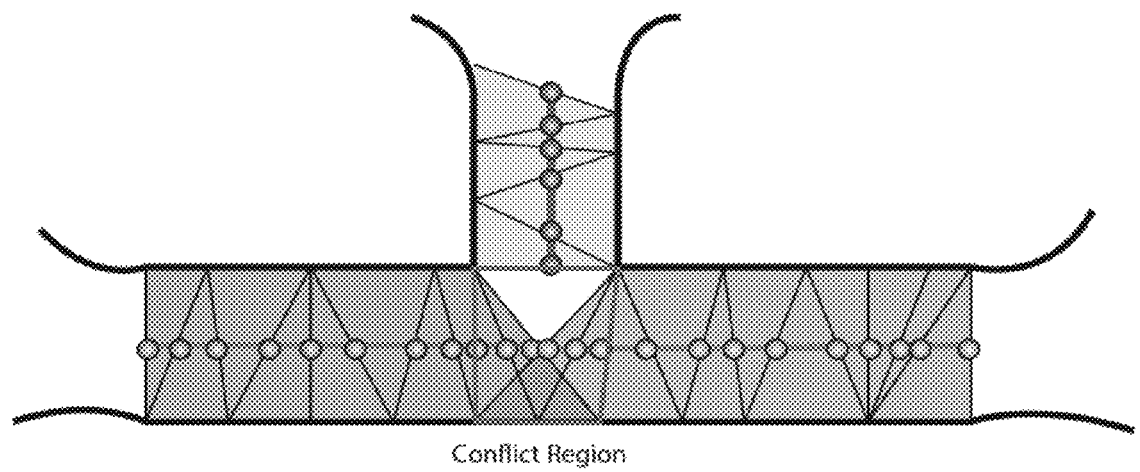
FIG. 12A — Conflict Region
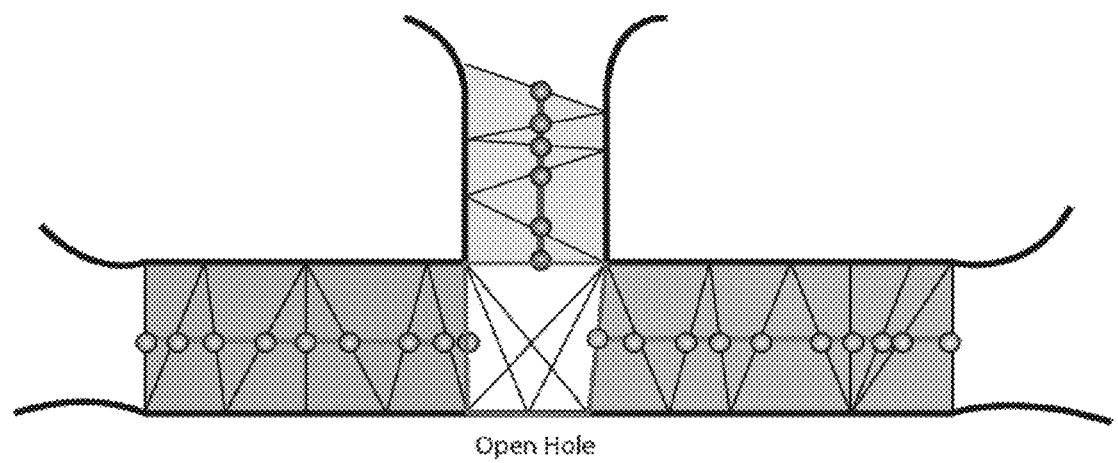
FIG. 12B — Open Hole
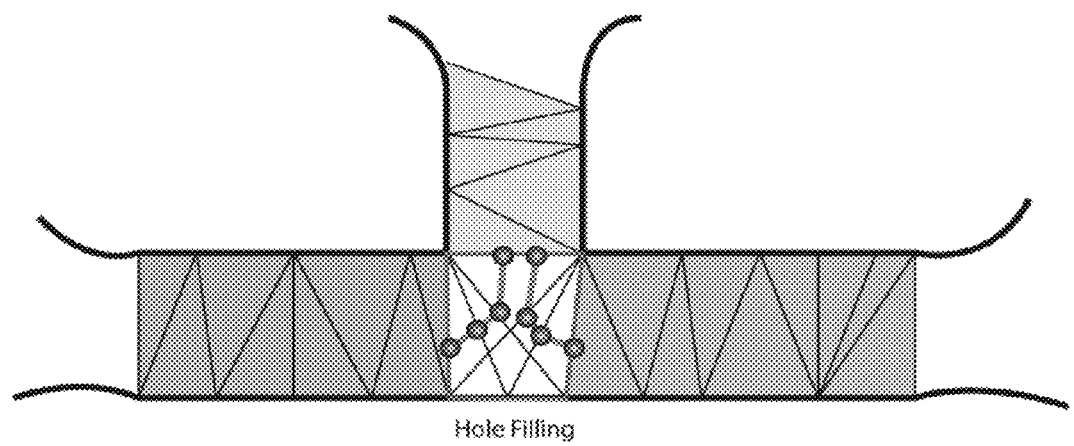
FIG. 12C — Hole Filling

SYSTEM AND METHOD FOR GENERATING A MANIFOLD SURFACE FOR A 3D MODEL OF AN OBJECT USING 3D CURVES OF THE OBJECT

PRIORITY INFORMATION

This application claims benefit of priority of U.S. Provisional Application Ser. No. 61/377,811 entitled "System and Method for Generating a Manifold Surface for an Object Using 3D Curves of the Object" filed Aug. 27, 2010, the content of which is incorporated by reference herein in its entirety.

BACKGROUND

Three-dimensional (3D) modeling of physical objects has many applications in the area of computer graphics. For example, computer-based 3D models of objects may be employed to generate animation, to insert digital images into film or photographic images, to design objects, and for many other purposes. As computing power has increased and 3D modeling algorithms have become more sophisticated, it has become possible to model objects of increasing complexity. A set of 3D curves may be used to represent a model of an object, for example, in a wire-based or sketch-based modeling system. The set of 3D curves may depict the shape and form of the object by defining salient features of the object. However, the set of 3D curves may not define the full surface topology of the object.

It is often necessary to topologically connect the set of 3D curves for an object to represent the full surface of the object. A representation of the surface of the object may be needed for further modeling and/or visualization tasks. Conventional methods form a surface from a set of 3D curves by first projecting the curves down into a lower dimension, thus parameterizing the curves into a two-dimensional (2D) plane. Within the 2D plane, tessellation may be performed to connect the projected curves together as a topological network that forms a manifold surface in 3D. Such a projection method may, when embedding the curves into the 2D plane, induce distortion in the surface and may generate self-intersecting curves. This may result in poor tessellation (e.g., long, stretched sliver triangles) and even failure to generate a tessellated network if the 2D tessellation algorithm is not carefully designed to handle overlapping curves. Furthermore, such conventional methods, which are dependent on a single curve parameterization, only provide a single surface solution, which may or may not satisfy a user's desired 3D model of the object's surface.

Conventional methods for reconstructing a surface of a 3D model using 3D curves which define the shape of the model place various restrictions on the set of 3D curves. For example, conventional methods may reconstruct the surface of the 3D model of an object using clouds of points which reside on the 3D curves. Such conventional methods rely on a dense sampling of the points on the curves in order to reconstruct the surface of the 3D model. As another example, conventional methods require that normal information and spatial position is known for the 3D curves. Such conventional methods may also depend on an assumption that a watertight, closed shape is being generated. Such an assumption may be used to infer whether points on a surface reside on the "inside" or "outside" of a closed shape. The restrictions placed on the set of 3D curves by conventional methods may severely limit the types of 3D curves that may be used to reconstruct the surface of a 3D model from the curves.

SUMMARY

A system and methods for generating a manifold surface for a three-dimensional (3D) model of an object from 3D curves which define the shape of the object are described herein. The system for generating a manifold surface may receive a plurality of 3D curves which define the shape of the object. For example, the plurality of 3D curves may be received from a sketch-based modeling system, or a wire-based modeling system, in which 3D curves are used to define the shape of a 3D model of an object. The system may generate, in the 3D domain, a tessellation which represents the plurality of 3D curves. As an example, the tessellation may be a Delaunay tetrahedralization which may connect points of the 3D curves. The surfaces of the tetrahedrons that may be generated by the Delaunay tetrahedralization may form a surface which connects the plurality of 3D curves. The surface may contain a set of possible manifold surface solutions for the 3D model.

The system for generating a manifold surface from 3D curves of an object may, dependent on the tessellation and one or more metrics, generate a plurality of manifold surface solutions. Each one of the plurality of manifold surface solutions may represent a different potential surface for a 3D model of the object. The system for generating a manifold surface may generate surface patches which may form the plurality of manifold surface solutions. The surface patches may be generated dependent on the tessellation and the one or more metrics. The one or more metrics may reduce the number of surface patches, and, as a result, may reduce the number of potential manifold surface solutions. A representation of at least one of the plurality of manifold surface solutions may be displayed.

BRIEF DESCRIPTION OF THE DRAWINGS

FIG. 5A illustrates an example of a surface patch between two open curves, according to some embodiments.

FIG. 5B illustrates an example of a surface patch within a closed curve, according to some embodiments.

FIGS. 8A-8C illustrate an example of surface patch growth along a span of two curves, according to some embodiments.

FIG. 12A illustrates an example of overlapping, compatible surface patches which are in conflict within the overlap region, according to some embodiments.

FIG. 12B illustrates an example of removing joint triangles to resolve a conflict region between surface patches, according to some embodiments.

FIG. 12C illustrates an example of generating new closed curves to fill the open hole region illustrated in FIG. 12B, according to some embodiments.

Figure 1B:
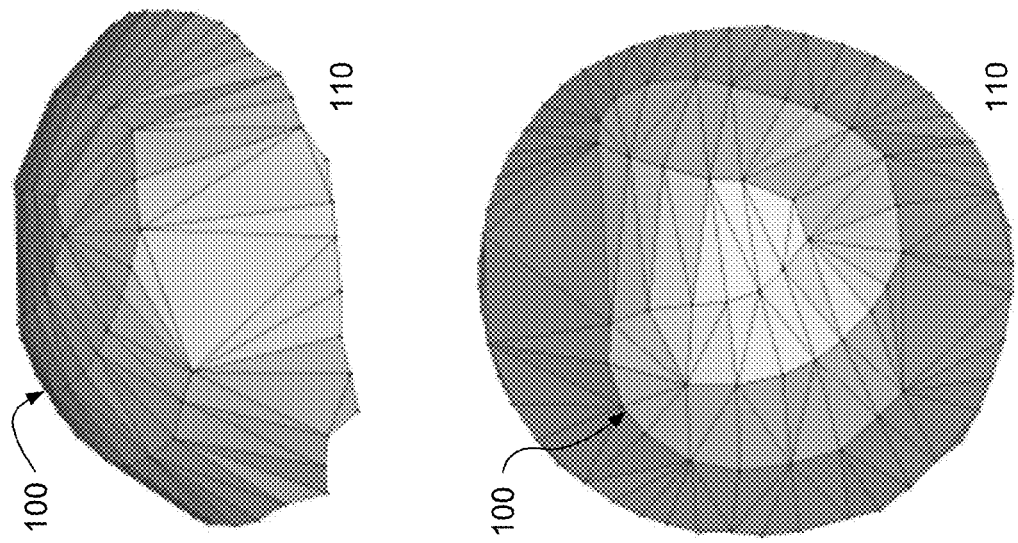
FIG. 1B illustrates an example of a manifold surface solution which passes through the set of 3D curves illustrated in FIG. 1A, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the description may be presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction

A system and methods for generating a manifold surface for a 3D model of an object from a set of 3D curves which define the shape of the object is described herein. The system may generate an orientable manifold surface which passes through, or connects, each curve in the set of 3D curves. An orientable surface is a surface for which is possible to make a consistent choice of surface normal vector at every point. A manifold surface may be a surface that is adjacent to a maximum of two sides of each curve which defines the surface of the object. A surface that is adjacent to more than two sides of any curve on the surface of the object may not be a manifold surface. For example, a surface that is adjacent to three sides of a curve on the surface of the object may not be a manifold surface. For a particular set of 3D curves, many possible manifold surface solutions may exist which may connect the set of 3D curves. Searching through the entire set of possible surface solutions for solutions which satisfy a particular set of criteria may be time-consuming and computationally expensive. Accordingly, as described in further detail below, the system for generating an orientable manifold surface may reduce the possible set of manifold surface solutions in order to decrease computation time and expense.

Figure 1A:
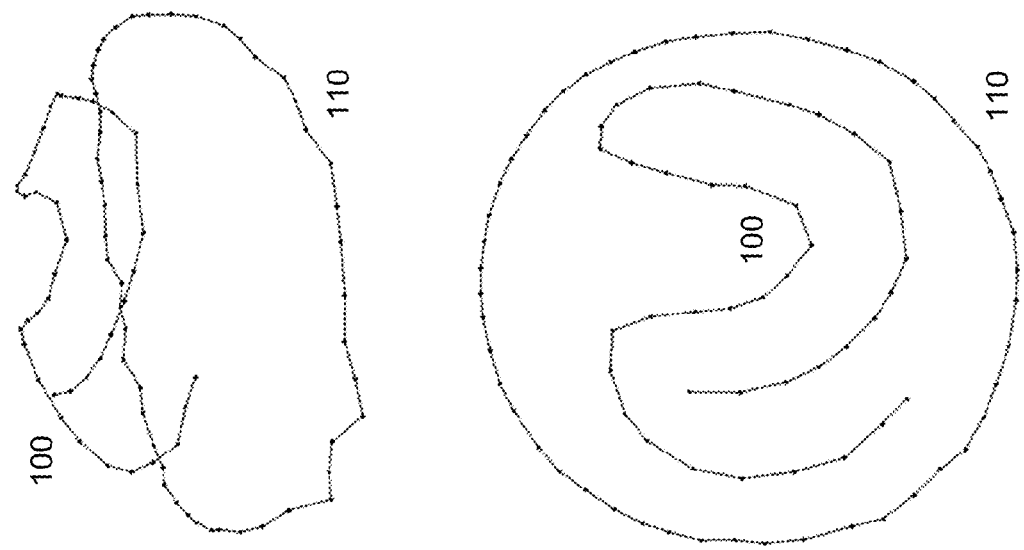
FIG. 1A illustrates an example of a non-intersecting set of open and closed curves which define the shape of an object, according to some embodiments.

A set of 3D curves which define the shape of an object may be a set of non-intersecting, open and/or closed curves, which may be defined as $c^i \in C$. An example of such a set of curves is illustrated in FIG. 1A. FIG. 1A illustrates open curve 100, as seen from two different viewpoints of an object. FIG. 1A also illustrates closed curve 110, as seen from the same two viewpoints of the object. FIG. 1B illustrates curves 100 and 110, as drawn on a manifold surface of the object. Note that the manifold surface illustrated in FIG. 1B is adjacent to a maximum of two sides of curve 100 and curve 110.

Each curve in the set of 3D curves that define a shape of an object may have an associated capacity value, capacity($c_i$). The capacity value for a curve may indicate how many sides of the curve are adjacent to a surface on which the curve exists. As an example, the capacity value of a curve may be indicated by a value of one or two. A value of one may indicate that one side of the curve is adjacent to the surface. A value of two may indicate that two sides of the curve are adjacent to the surface. In such an example, where the capacity value of a curve may equal to a value of one or two, the capacity value for the curve may be represented as shown in equation 1:

$$\text{capacity}(c_i) \in \{1, 2\} \quad (1)$$

Curve 100 in FIGS. 1A and 1B is an example of a curve which has a capacity value of two. Note that the surface of the object illustrated in FIG. 1B is adjacent to two sides of curve 100. Curve 110 in FIGS. 1A and 1B is an example of a curve which has a capacity value of one. Note that the surface of the object illustrated in FIG. 1B is adjacent to one side of curve 110. All curves on a manifold surface may each have a capacity value that is less than, or equal to, two. In other words, as described above each curve on a manifold surface may be adjacent to the surface on a maximum of two sides of the curve. A curve with a capacity value greater than two (e.g. a capacity value of three) may be a curve which represents a surface that is not a manifold surface. In other embodiments, values other than the numerals one and two may be used to represent the capacity value of a curve. For example, a binary representation may be used to represent the capacity value of a curve since the capacity value for curves of a manifold surface may be one of two possible values.

The system for generating a manifold surface from a set of 3D curves which define the shape of an object may be operable to generate a set of possible manifold surface solutions. Each manifold surface solution may pass through the set of 3D curves and may satisfy the capacity value for each 3D curve. Note that there may be numerous, different manifold surface solutions that may satisfy these criteria for the set of 3D curves. Accordingly, the system for generating a manifold surface may provide multiple manifold surface solutions, dependent on a variety of factors, as described in further detail below. An example of a manifold surface solution which satisfies the criteria for curves 100 and 110 is illustrated in FIG. 1B.

Each 3D curve, $c^i$, in a set of 3D curves may be a sampled piecewise linear polyline of points, $p^i_j$, which may be represented as shown in equation 2:

$$p^i_j \in c^i \quad (2)$$

FIGS. 1A and 1B illustrate examples of points, $p^i_j$, which may exist on curves 100 and 110. The spatial proximity of the 3D curves to each other may determine probable connections between the points on the 3D curves. Such connections between points, as described in further detail below, may form a manifold surface. In contrast to conventional methods, the system for generating a manifold surface may use knowledge of the spatial proximity of the 3D curves to reconstruct a surface from the 3D curves. The system for generating a manifold surface may use the spatial proximity of the 3D curves in lieu of other information for the 3D curves which may not be available, such as information regarding normals along the 3D curves.

As an example, consider a set of k open curves which define the shape of a 3D object. Each curve in the set of k open curves may have a capacity value of two. In such an example, the number of possible ways in which the network of k open curves may be connected to form a manifold surface may grow exponentially as k, the number of curves, increases. An analogous 2D example of a set of 3D curves may be a network of routes which connect a collection of cities. Finding a shortest route through all of the cities, which passes through each city only once, may be analogous to the problem of finding a manifold surface which connects the set of 3D curves. The network of connections between the cities may form a 2D manifold surface. Each connection between two cities may be labeled with a distance. Finding a minimal length route between a starting city and an ending city, while visiting each one of the other cities only one time is the well studied, non-deterministic polynomial-time hard (NP-hard), traveling salesman problem. An algorithm that evaluates all permutations (e.g., ordered combinations) of the routes between cities and determines the shortest route via a brute force search may be used to compute a direct solution to this problem. The computational time that may be required to compute the solution using such an algorithm may be represented by equation 3, $$O(n!) \quad (3)$$

Alternatively, an algorithm which uses an application of dynamic programming may be used to compute a direct solution to this problem. The computational time that may be required to compute the solution using such a dynamic programming algorithm may be represented by equation 4, $$O(n^2 2^n) \quad (4)$$

In equations 3 and 4, n may represent the number of cities.

Analogous to the 2D traveling salesman problem described above, the goal of the system for generating a manifold surface may be to find a minimal (e.g., smallest surface area) manifold surface solution that connects a set of 3D curves. The 3D solution that connects the set of 3D curves may be at least as difficult, and computationally expensive, as the solution to the 2D traveling salesman problem described above. Specifically, the computational time required to compute the 3D solution may be at least as long as the time represented by equation 3 or equation 4, with n representing the number of 3D curves. Accordingly, rather than generate all possible solutions for connecting the set of 3D curves (which may be a very large set of solutions) the system for generating a manifold surface may generate a reduced set of manifold surface solutions from which a user may choose a preferred solution. The optimality of the solution with respect to a given metric (e.g., minimal surface area) may be limited within the reduced set of solutions generated by the system. Accordingly, the system for generating a manifold surface may not always produce a globally optimal solution. However, the system for generating a manifold surface may decrease computational expense by using a set of limiting heuristics to produce a reduced set of potential manifold surface solutions.

The system for generating a manifold surface may reduce the set of potential connections between curve points, which may, in turn, reduce the number of surfaces that may be evaluated as potential manifold surface solutions. Again considering the analogous 2D problem described above, the routes between cities may form a dense graph. The graph may be reduced by forming a Delaunay triangulation of the space represented by the 2D routes. The Delaunay triangulation may reduce the set of possible connections between by cities by connecting cities within close proximity to one another (e.g., neighboring cities). More specifically, instead of connecting each city to each other city, only neighboring cities may be connected by the Delaunay triangulation. Connecting only neighboring cities may significantly reduce the number of connections between cities. Accordingly, a graph which represents the Delaunay triangulation may be less dense than the original graph, and, as a result, may reduce the possible set of connections that may be examined to determine a preferred path through the cities. Furthermore, the Delaunay triangulation may ensure that the paths of the possible routes do not intersect with each other. Ensuring that the paths do not intersect may be an important consideration in 3D space, as the resulting manifold surface should not intersect with itself.

The system for generating a manifold surface may use an approach similar to the 2D Delaunay triangulation method described above to generate a set of manifold surface solutions which connect a set of 3D curves. For example, as described in further detail below, the system may generate a Delaunay tetrahedralization to reduce the set of possible connections between the 3D curves. As described above, each 3D curve may be a sampled, piecewise linear polyline of points, $p^i_j$. A manifold surface may be generated by connecting points between curves. The Delaunay tetrahedralization may connect the points of curves that are in close spatial proximity to one another (e.g., neighboring curves). Since only neighboring curves may be connected, rather than connecting each curve to each other curve, the set of connections between curves may be reduced, which may, in turn, reduce the potential set of manifold surface solutions. The faces of the tetrahedrons generated in the Delaunay tetrahedralization may form the set of surfaces for the potential manifold surface solutions.

There may be a large number of tetrahedrons which may be generated by the Delaunay tetrahedralization. Accordingly, the system for generating a manifold surface may have a large number of faces to evaluate in order to generate a set of manifold surface solutions. The system may further reduce computation time and expense by reducing the potential set of tetrahedron faces which may be evaluated for inclusion in a manifold surface solution. As described in further detail below, to reduce the computational expense of evaluating all faces in the Delaunay tetrahedralization to determine a set of valid faces, the system may gather collections of faces into surface patches. The number of surface patches may be less than the number of faces of the Delaunay tetrahedralization. Accordingly, the surface patches may enable the system to evaluate a smaller number of surfaces to determine a set of valid surfaces for a manifold surface solution. Evaluating a smaller number of surfaces may reduce computational expense.

A set of possible manifold surface solutions may be generated from the surface patches that are determined to be valid. The set of possible manifold surface solutions may be displayed to a user and may be selectable by the user. Accordingly, a user may select one or more of the manifold surface solutions that represent the user's desired intent for the 3D model. Note that for some closed curve networks (e.g., curve networks in which the closed curves form knots) there may not exist a manifold surface solution that satisfies the prescribed curve capacity constraints. The system for generating a manifold surface may consider such cases as pathological cases for which a solution is not required.

Manifold Surface Generator

Figure 2:
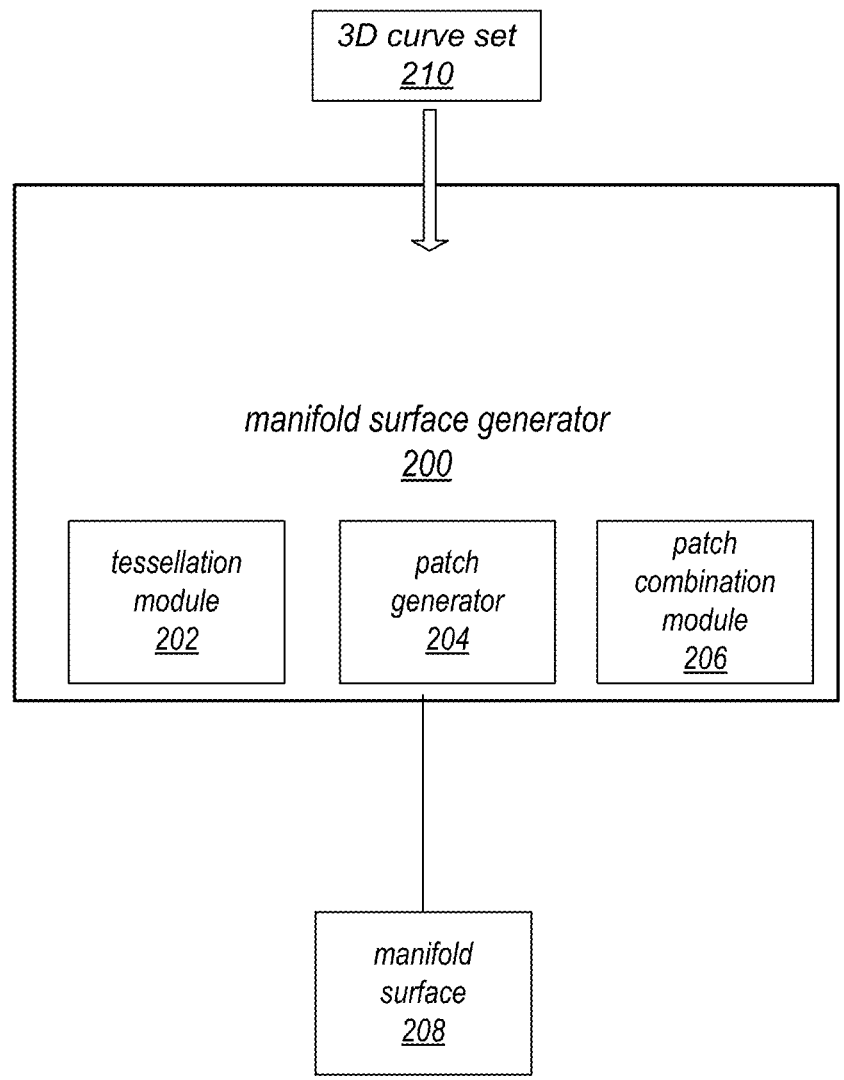
FIG. 2 illustrates an example of a manifold surface generator which may be operable to generate a manifold surface for a 3D model of an object from 3D curves which define the shape of the object, according to some embodiments.

FIG. 2 illustrates an example of a manifold surface generator which may be operable to generate a manifold surface for a 3D model of an object from 3D curves which define the shape of the object. Manifold surface generator 200 may be operable to receive a set of 3D curves 210 which may define the shape of a 3D object. As described above, the set of 3D curves 210 may be non-intersecting, open and/or closed curves, for example, as illustrated in FIGS. 1A and 1B. Tessellation module 202 of surface generator 200 may be operable to generate a tessellation which forms a surface that connects the set of 3D curves 210. The surface may include the set of potential manifold surface solutions. In some embodiments, the tessellation may be a Delaunay tetrahedralization. The Delaunay tetrahedralization may reduce the set of possible connections between points on the 3D curves that may be formed to generate surfaces for the manifold surface solutions.

Patch generator 204 may be operable to reduce the set of surfaces which may be evaluated for inclusion in a manifold surface 208. Patch generator 204 may reduce the set of potential surfaces by combining faces of the tetrahedrons to form surface patches. As described in further detail below, to form the surface patches, patch generator 204 may be operable to generate a dual form of the Delaunay tetrahedralization to compute a set of Voronoi cell faces. Patch generator 204 may be operable to generate a dual form of a dual graph which represents the Voronoi cell faces and may use the dual graph to form the surfaces patches. Patch combination module 206 of surface generator 200 may be operable to determine compatible surface patches and may combine the compatible surface patches to form multiple potential solutions for manifold surface 208.

Manifold surface generator 200 may be implemented as or in a stand-alone application or as a module of or plug-in for an image processing and/or presentation application. Examples of types of applications in which embodiments of module 200 may be implemented may include, but are not limited to, video editing, processing, and/or presentation applications, as well as applications in security or defense, educational, scientific, medical, publishing, digital photography, digital films, games, animation, marketing, and/or other applications in which digital image editing or presentation may be performed, e.g., where 3D aspects of scenes or image objects are relevant. Specific examples of applications in which embodiments may be implemented include, but are not limited to, Adobe® Photoshop® and Adobe® Illustrator®.

Work Flow

Figure 3:
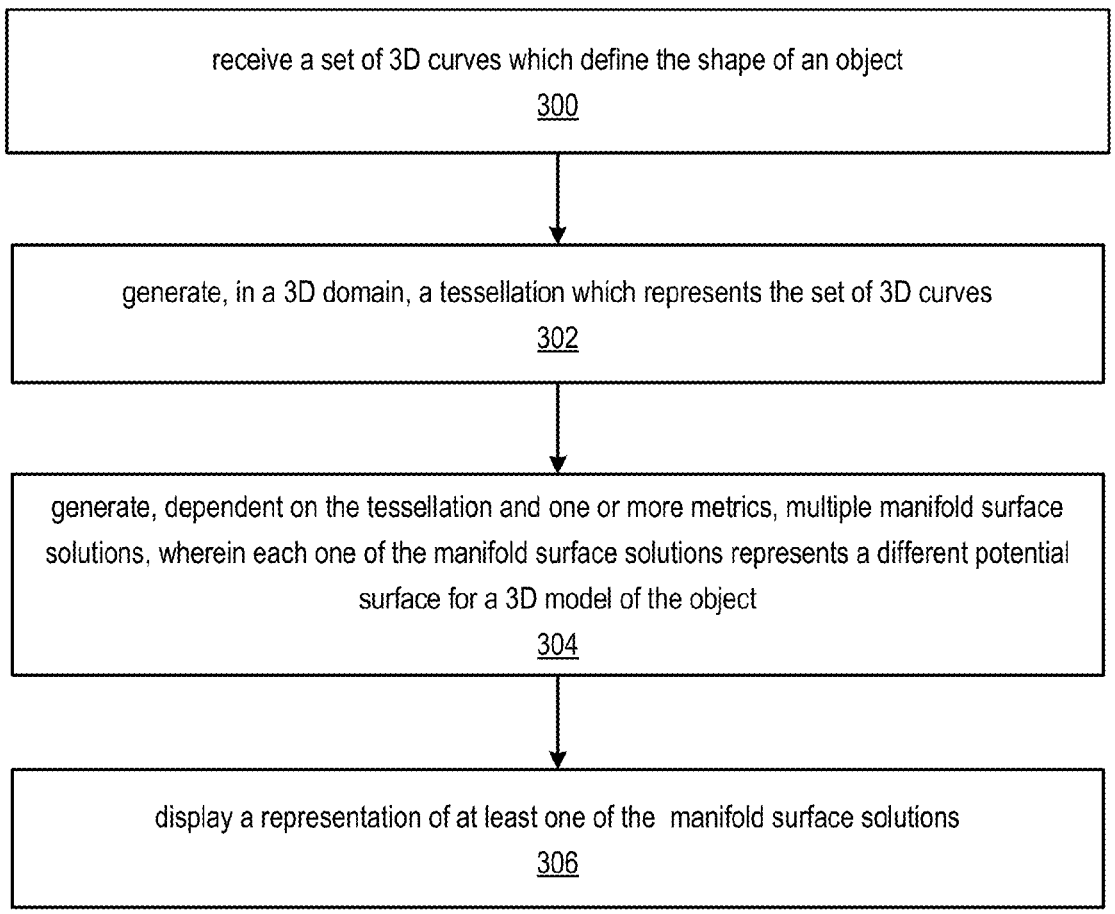
FIG. 3 illustrates an example method for generating a manifold surface for a 3D model of an object from a set of 3D curves which define the shape of the object, according to some embodiments.
Figure 4C:
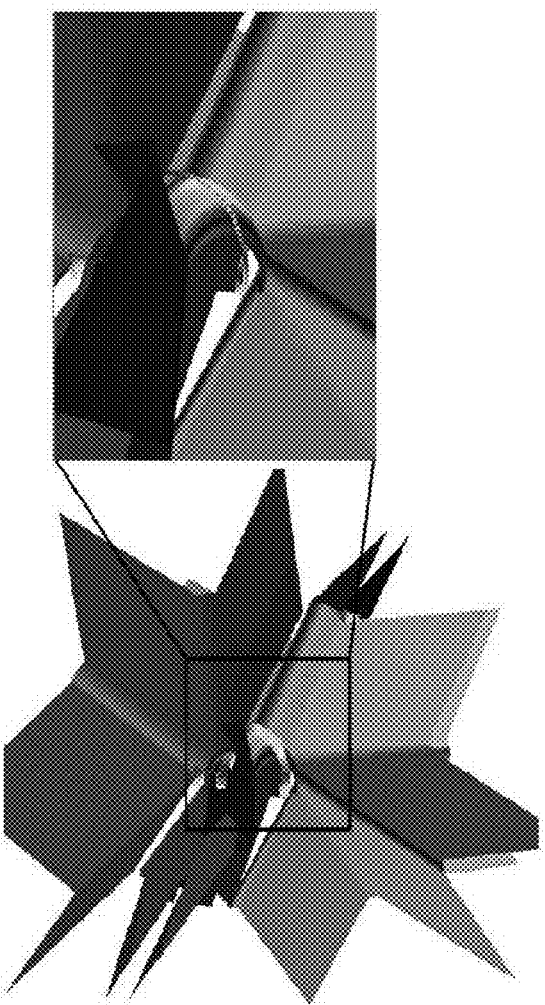
FIG. 4C illustrates an example of a Voronoi diagram, generated from the Delaunay tetrahedralization illustrated in FIG. 4B, according to some embodiments.
Figure 4B:
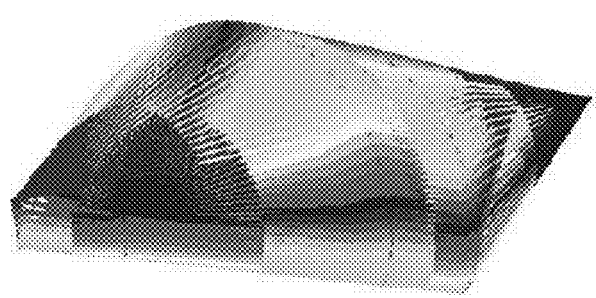
FIG. 4B illustrates an example of a Delaunay tetrahedralization, generated from the 3D curve illustrated in FIG. 4A, according to some embodiments.
Figure 4A:
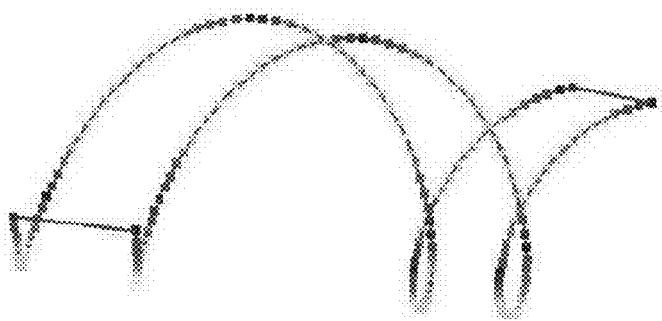
FIG. 4A illustrates an example of a closed, non-intersecting 3D curve, according to some embodiments.

FIG. 3 illustrates an example of a method for generating a manifold surface for a 3D model of an object from a set of 3D curves which define the shape of the object. As indicated at 300, the method illustrated in FIG. 3 may include receiving a set of 3D curves which define the shape of an object. For example, manifold surface generator 200 may receive a set of non-intersecting, open and/or closed, 3D curves, such as 3D curve set 210 in FIG. 2. FIG. 1 illustrates an example of an open curve, 100, and a closed curve, 110, that may be received by surface generator 200 as a set of 3D curves. FIG. 4A illustrates an example of a closed, non-intersecting 3D curve that may be received by surface generator 200 as part of a 3D curve set.

As indicated at 302, the method illustrated in FIG. 3 may include generating, in a 3D domain, a tessellation which represents the set of 3D curves. The tessellation may form a surface that connects the set of 3D curves. Manifold surface generator 200 may generate the tessellation directly in the 3D domain, without flattening the 3D curves, and without projecting the 3D curves down into a lower dimension. FIG. 4B illustrates an example of a Delaunay tetrahedralization which may be generated from the 3D curve illustrated in FIG. 4A. As an example, tessellation module 202 may compute a Delaunay tetrahedralization from the set of 3D curves 210. The Delaunay tetrahedralization may reduce the set of possible connections which may be made between points on the 3D curves when forming a surface that represents the 3D curves. The Delaunay tetrahedralization may connect the points of curves that are in close spatial proximity to one another (e.g., neighboring curves). Since only points on neighboring curves may be connected together by the Delaunay tetrahedralization, rather than connecting each curve point to each other curve point, the set of possible connections between curves may be reduced. Reducing the set of possible connections between curves may reduce the number of possible manifold surface solutions in the set of manifold surface solutions generated by manifold surface generator 200.

Tessellation module 202 may use various methods to compute the Delaunay tetrahedralization to form a sparse set of connections between points on the set of 3D curves. As an example, tessellation module 202 may use a method such as that described in [SI, H., 2009. Tetgen: A Quality Tetrahedral Mesh Generator and a 3D Delaunay Triangulator]. Tessellation module 202 may form the Delaunay tetrahedralization directly in the 3D domain of the 3D curves. Tessellation module 202 may not flatten the set of 3D curves, nor project the 3D curves into a lower dimension, to form the Delaunay tetrahedralization. A Delaunay tetrahedralization generated for a set of 3D curves may represent a well-defined surface, except when the set of 3D curves all lie in a single plane. Such 3D curve sets may be, by definition, projectable down to a lower dimension (e.g., a 2D plane) without distortion and, therefore, may be efficiently and accurately tessellated directly in the 2D domain. Accordingly, the system for generating manifold surfaces from 3D curves described herein may not be concerned with generating 3D models for such 3D curve sets which lie in a single plane.

FIG. 5A illustrates an example set of open curves, curve 0 and curve 1, which include multiple points that are marked with sequential indices (e.g. curve 0 includes sequential indices i−4 through i+6, and curve 1 includes sequential indices j+4 through j−6). FIG. 5A also illustrates an example of a Delaunay tetrahedralization (shown as the connected curve points which form triangular areas between the curves) that has been generated for curve 0 and curve 1. The Delaunay tetrahedralization, as illustrated in FIG. 5A, forms a set of connections between the points on curves 0 and 1. FIG. 5B illustrates an example of a closed curve, curve 2, which includes multiple points that are marked with sequential indices (e.g., indices i+6 through i−15). FIG. 5B also illustrates an example of a Delaunay tetrahedralization (shown as the connected curve points which form triangular areas in between the curve) which forms a set of connections between points on curve 2. As illustrated in FIGS. 5A and 5B, a Delaunay tetrahedralization may consist of multiple triangular faces (e.g., tetrahedron faces, in 3D space) which may connect the points on neighboring 3D curves.

The faces of the tetrahedrons generated by the Delaunay tetrahedralization may form the set of surfaces which may include the potential manifold surface solutions for a 3D object. More specifically, each potential manifold surface solution for the 3D object may be embedded in the set of surfaces generated by the Delaunay tetrahedralization. There may be a large number of tetrahedrons which may be generated by the Delaunay tetrahedralization. Each tetrahedron may have four triangular faces, each of which may contribute to a potential manifold surface solution. Accordingly, the system for generating a manifold surface may have a large number of faces to evaluate in order to generate a set of manifold surface solutions. Accordingly, the system may further reduce computation time and expense by reducing the set of tetrahedron faces which may contribute to the set of potential manifold surface solutions.

The faces of a Delaunay tetrahedralization may be represented by a variable, such as variable F. A subset of faces, $\hat{F}_i$, of the Delaunay tetrahedralization may be represented as shown in equation 5:

$$\hat{F}_i \subset F \tag{5}$$

The subset of faces, $\hat{F}_i$, may form a valid manifold surface if the surface formed by the subset of faces, $\hat{F}_i$, satisfies the curve capacity values for each one of the curves in the set of 3D curves. More specifically, a set of faces of the Delaunay tetrahedralization may form a valid manifold surface if each face is adjacent to a number of sides of each curve that is equivalent to the curve capacity specified for each curve. For example, in order to represent a valid manifold surface, the faces may be adjacent to exactly one side of each curve with a curve capacity value of one. As another example, to represent a valid manifold surface, the faces may be adjacent to exactly two sides of each curve with a curve capacity value of two.

The subset of faces, $\hat{F}_i$, may include multiple faces, fi. Each face fi in the subset of faces, $\hat{F}_i$, may be represented as shown in equation 6:

$$f_i \epsilon \hat{F}_i \tag{6}$$

A face, fi, may be considered a valid face for inclusion in a manifold surface solution if the face has edges that either coincide with curves in the set of 3D curves or the face has edges that are shared with another face, $f_j$, in the subset of faces, $\hat{F}_i$. Face $f_j$ may be represented by equation 7:

$$f_j \epsilon \hat{F}_i \tag{7}$$

In some embodiments, the combinatorial cost of finding all valid faces in a large collection of faces for a Delaunay tetrahedralization may be time consuming and computationally expensive. The system may further reduce computation time and expense by reducing the potential set of tetrahedron faces which may contribute to a manifold surface solution. As described in further detail below, to reduce the computational expense of evaluating all faces in the Delaunay tetrahedralization to determine a set of valid faces, manifold surface generator 200 may gather collections of faces into surface patches.

As indicated at 304, the method illustrated in FIG. 3 may include generating, dependent on the tessellation and one or more metrics, multiple manifold surface solutions, wherein each one of the manifold surface solutions may represent a different potential surface for a 3D model of the object. Manifold surface generator 200 may generate, dependent on the faces generated by the Delaunay tetrahedralization, several collections of surface patches. Each collection of surface patches may represent a manifold surface that connects the set of 3D curves.

As described in further detail below, the system may generate the surface patch collections by forming a set of Voronoi cell faces from the Delaunay tetrahedralization. For example, the system may form the set of Voronoi cell faces by computing a dual form, or dual graph, of the Delaunay tetrahedralization. The set of Voronoi cell faces may form a surface which may pass through the empty space between the 3D curves. FIG. 4C illustrates an example of a Voronoi diagram, which may be generated from the Delaunay tetrahedralization illustrated in FIG. 4B. The system may then generate a face dual of the set of Voronoi cell faces to create a similar surface which also passes through the space between the 3D curves. A dual form graph which represents the similar surface may be generated. Each vertex in the dual form graph may coincide with an edge of a face generated by the original Delaunay tetrahedralization.

The system may progress along the dual form graph to collect spans of curve points which may be joined to form surface patches. The system may evaluate the surface patches to determine which surface patches are valid for inclusion in a manifold surface solution. Since each surface patch that is formed may include multiple faces of the tetrahedrons formed by the Delaunay tetrahedralization, the number of surface patches may be smaller than the number of tetrahedron faces. Accordingly, evaluating the surface patches for inclusion in a manifold surface solution may be faster and less computationally expensive than evaluating all of the faces of the tetrahedrons. A set of possible manifold surface solutions may be generated from the surface patches that are determined to be valid.

As indicated at 306, the method illustrated in FIG. 3 may include displaying a representation of at least one of the manifold surface solutions. For example, manifold surface generator 200 may display a representation of one of the manifold surface solutions. As another example, manifold surface generator 200 may display representations of a subset of, or all of, the manifold surface solutions. In some embodiments, manifold surface generator 200 may display the representation(s) of the manifold surface solution(s) within a user interface. The user interface may enable a user to select one or more preferred manifold surface solutions from the set of manifold surface solutions. For example, the user may select a manifold surface solution which best matches the user's desired 3D model of the object. Note that for some closed curve networks (e.g., curve networks in which the closed curves form knots) there may not exist a manifold surface solution that satisfies the prescribed curve capacity constraints. The system for generating a manifold surface may consider such cases as pathological cases for which a solution is not required.

Surface Patch Generation

Patch generator 204 may reduce the search space for possible manifold surface solutions by grouping spans of faces from the Delaunay tetrahedralization into surface patches. Patch generator 204 may be operable to generate a set of surface patches such that the number of surface patches is smaller than the number of total faces of the Delaunay tetrahedralization. Such surface patches may connect disjoint spans of curve regions between separate curves. The surface patches may also connect spans of curve regions within a curve itself. Patch generator 204 may define a surface patch to be a strip of manifold triangles which is bounded by a curve on two opposite sides and is open at two ends. Patch generator 204 may require that the indices of points on the curve on either side of the surface patch strip consecutively increment or decrement. Note that for closed curves, the point indices may wrap around the curve.

FIG. 5A illustrates an example of a surface patch (shown as the gray, shaded area) between two open curves. Note that the curve point indices consecutively increase from left to right across the top of the surface patch. Further note that the curve point indices consecutively decrease from left to right across the bottom of the surface patch. FIG. 5B illustrates an example of a surface patch (shown as the gray, shaded area) within a closed curve. Note that the curve point indices consecutively increase from left to right across the top of the surface patch. Further note that the curve point indices consecutively decrease from left to right across the bottom of the surface patch. FIGS. 5A and 5B both illustrate examples of valid surface patches in which consecutive curve point indices are paired (e.g., connected) along the span of the surface patch. The requirement for consecutively incrementing or decrementing indices may ensure that a surface patch does not fold back on itself, and thus facilitates generation of an orientable manifold surface. A surface patch that folds back on itself may make a non-manifold "pocket" or a fold in the manifold surface, which may be an inaccurate representation of the actual surface of the object for which the 3D model is being generated.

Figure 6:
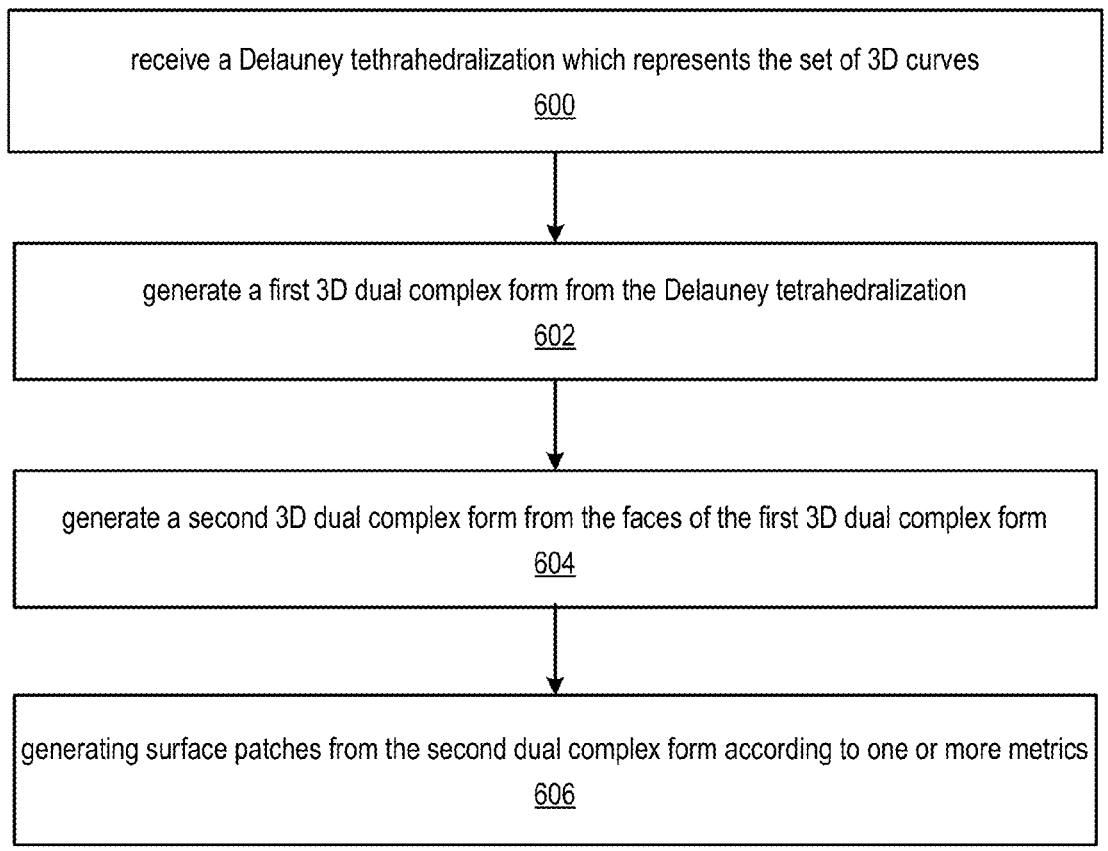
FIG. 6 illustrates an example method that may be used to group Delaunay tetrahedralization faces into surface patches, according to some embodiments.

Patch generator 204 may generate surface patches using a variety of methods. FIG. 6 illustrates an example method that patch generator 204 may use to group the tetrahedron faces into surface patches. As shown at 600, the method illustrated in FIG. 6 may include receiving a Delaunay tetrahedralization that represents the set of 3D curves. For example, patch generator 204 may receive, from tessellation module 202, a Delaunay tetrahedralization which may be generated in the manner described above in reference to element 302 of FIG. 3.

Figure 7A:
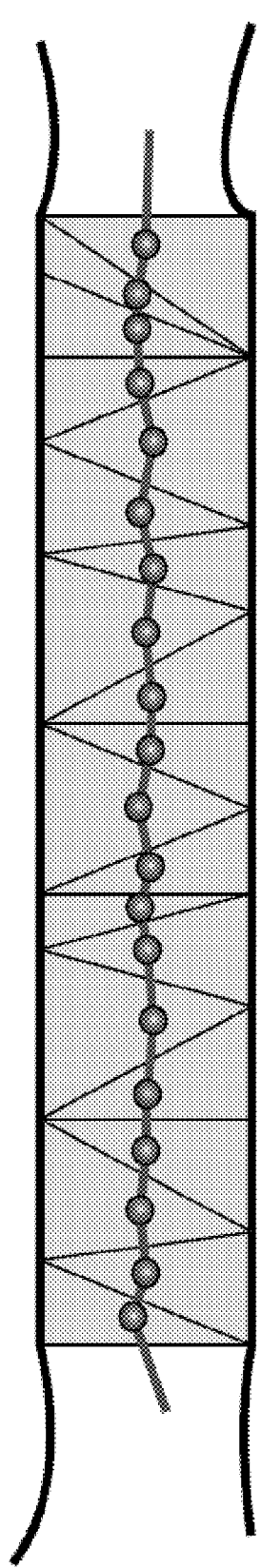
FIG. 7A illustrates an example of a first 3D dual complex form that may be generated from a Delaunay tetrahedralization, according to some embodiments.

As shown at 602, the method illustrated in FIG. 6 may include generating a first 3D dual complex form from the Delaunay tetrahedralization. To generate the first 3D dual complex form from the Delaunay tetrahedralization, patch generator 204 may replace each tetrahedron in the Delaunay tetrahedralization with a vertex. A vertex for a corresponding tetrahedron may be placed at the circumscribed sphere center of the corresponding tetrahedron. FIG. 7A illustrates an example of a first 3D dual complex form that may be generated from a Delaunay tetrahedralization. The circles in FIG. 7A illustrate an example of vertices placed at the circumcenter of each tetrahedron. Patch generator 204 may form the 3D dual complex form by connecting the vertices of adjacent tetrahedrons. The faces of the 3D dual complex may form a type of skeleton which may be directly analogous to a Chordal Axis transform described in 2D. The line connecting the circles in FIG. 7A illustrates an example of such a skeleton. Note that the skeleton may form a surface that passes between the curves. Each face of the dual complex surface may form a Voronoi like boundary between two curve vertices.

Figure 7B:
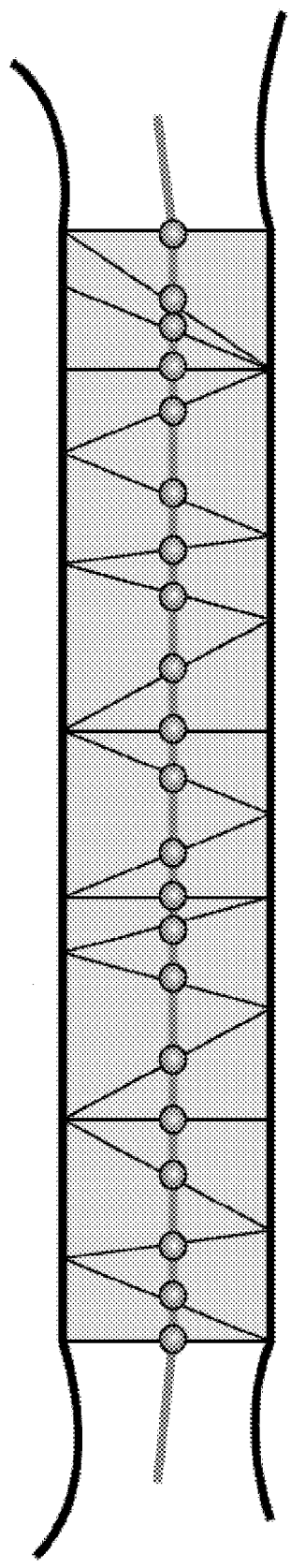
FIG. 7B illustrates an example of a second 3D dual complex from that may be generated from the faces of a first 3D dual complex form, according to some embodiments.

As indicated at 604, the method illustrated in FIG. 6 may include generating a second 3D dual complex form from the faces of the first 3D dual complex form. FIG. 7B illustrates an example of a second 3D dual complex form that may be generated from the faces of the first 3D dual complex form. From each face of the first dual complex form, patch generator 204 may create a vertex for the second dual complex form. Each vertex may align with an edge of a face from the Delaunay tetrahedralization. Examples of the vertices of the second 3D dual complex form are illustrated by the circles in FIG. 7B. Patch generator 204 may connect adjacent vertices from adjacent faces of the first dual complex. For example, as illustrated by the connected circles in FIG. 7B, adjacent vertices may be connected. The connected vertices may generate a dual graph for the second dual complex. Each vertex in the dual graph may represent an edge generated from the Delaunay tetrahedralization. The graph for the second dual complex may have a structure which is similar to the structure of the first dual complex. For example, the graph for the second dual complex may form a 3D surface skeleton that passes through the empty space between the 3D curves. Since each vertex of the second dual complex form may align with an edge of a face from the Delaunay tetrahedralization, the vertices may be referred to herein as de vertices.

As shown at 606, the method illustrated in FIG. 6 may include generating surface patches from the second dual complex form according to one or more metrics. As described in further detail below, patch generator 204 may form surface patches by progressing along neighboring de vertices and joining faces of the Delaunay tetrahedralization that are between the neighboring de vertices. Note that the second dual complex form, represented by the line connecting the vertices in FIG. 7B, may form a 3D surface that spans the space between the 3D curves. Accordingly, there may be a variety of ways that valid surface patches may be formed to represent a surface region defined by one or more 3D curves. To reduce computational expense, patch generator 204 may be configured to find a single valid surface patch for each region that is defined by one or more 3D curves. As described in further detail below, patch generator 204 may use Dijkstra's shortest path algorithm and one or more metrics to generate such a valid surface patch for a surface region defined by one or more 3D curves.

To generate surface patches (e.g., to grow surfaces patches) using the second dual complex form, patch generator 204 may start with a Delaunay edge vertex (e.g., a de vertex) and move outward along a span of index pairs (e.g., curve points) that have been connected for two curves (or, for a single closed curve). For example, patch generator 204 may start at a de vertex at one end of a span of connected curves and may progress along neighboring de vertices towards the other end of the span of the connected curves. In other embodiments, other surface patch growth methods may be employed. For example, patch generator 204 may begin in the middle of a span of connected curves and progress in multiple, opposite directions, to the ends of the span of connected curves, while growing a surface patch across the span of connected curves.

FIGS. 8A-8C illustrate an example of surface patch growth along a span of connected curves. The curves illustrated in FIGS. 8A-8C may be a pair of curves for which points (e.g., indices) on the curves are connected, for example, as illustrated in FIG. 5. As illustrated in FIG. 8A, patch generator 204 may select, as a starting point for a surface patch, a de vertex within a second dual complex form that has been generated for the curves. Patch generator 204 may move outward from the first de vertex to grow the surface patch. As illustrated in FIG. 8B, patch generator 204 may move bi-directionally along the area between the connected curves. Patch generator 204 may move along the vertices of the second dual complex form to locate faces of the Delaunay tetrahedralization that may be joined to create the surface patch. The gray, shaded area in FIG. 8B illustrates a surface patch that is being created by joining faces of the Delaunay tetrahedralization. Note that patch generator 204 may move along sequential indices of the connected curve points to locate faces which may be added to the surface patch. Patch generator 204 may continue to add faces to the surface patch until the indices of the edges which define the faces are no longer sequential, or until the faces no longer associated with the same set of curves. FIG. 8C illustrates an example of the boundaries at which patch generator 204 may stop adding faces to generate a surface patch.

As illustrated at FIGS. 8A-8C, a surface patch may be defined by a set of consecutive de vertices and may create a span, or surface region, between two curve segments. Given an arbitrary first de vertex, a surface patch may be grown uni-directionally, or bi-directionally, to locate all surface patches that pass though the de vertex. All of the potential surface patches for a set of 3D curves may be located by growing surface patches from every de vertex in the set of 3D curves.

Patch generator 204 may follow Dijkstra's shortest path algorithm to grow the surface patches. For a given source vertex (node) in a graph, Dijkstra's algorithm may find the path with lowest cost (e.g., the shortest path) between the given source vertex and every other vertex in the graph. Dijkstra's shortest path algorithm may be implemented by gradually growing a tree that originates at the source node. All leaves (e.g., nodes) may be saved in a priority queue that may be associated with the path cost. Each node may be independently selected from the priority queue and Dijkstra's shortest path algorithm may be applied to determine the shortest path between the node and each other node in the tree. The cost of each of the incident (e.g., neighboring) nodes of the selected node may be updated if the cost of a new path through a newly selected node is smaller. Patch generator 204 may grow surface patches in a manner similar to that used in Dijkstra's algorithm. For example, every de vertex in the second dual form graph may be equivalent to a node in Dijkstra's algorithm. A surface patch which connects multiple neighboring de vertices may be equivalent to a path in Dijkstra's algorithm which connects incident nodes.

As described above, patch generator 204 may use one or more metrics to generate a valid surface patch. The one or more metrics may define the "cost" of a surface patch, and, thus, may enable patch generator 204 to generate a surface patch that minimizes cost according to a particular criteria. The cost associated with growing a surface patch may vary according to the intention of the user. The system for generating a manifold surface may provide a user with a choice of several metrics, or preferences, which may determine how de vertices are connected to grow surface patches. More specifically, patch generator 204 may choose a neighboring vertex to be added to a surface patch based on a metric that has been specified for surface patch growth for a particular set of 3D curves.

The one or more metrics specified for surface patch growth may be related to surface area and may specify that the generated surface patches should include a minimal amount of surface area. In other words, the metric may specify that the surface area represented by the surface patches should be as small as possible. More specifically, the one or more metrics may define a desired distant measure between neighboring de vertices of a surface patch. For example, a distance metric may specify that the Euclidean distance between neighboring de vertices should be as short as possible. As another example, a distance metric may be a unit distance metric which may specify that a minimal number of edge connections (e.g., de vertices) should be used to connect the span between curves. Using a minimal amount of de vertices may reduce computational expense. In other embodiments, the one or more metrics for surface patch growth may specify that the surface patches should be grown such that the surface patches have a minimal amount of normal variation (e.g., the surface patches are as smooth as possible). Note that embodiments of the system may use a variety of different metrics to determine how de vertices may be connected to grow surface patches. The system is not limited to the example metrics described above.

As described above, patch generator 204 may use a shortest path algorithm to generate surface patches. The pseudo code for the shortest path algorithm that may be used by patch generator 204 to grow surface patches is detailed in the patch growth algorithm below. Note that a de vertex may be considered to be "incident" with (or, a "neighbor" of) another de vertex if the two de vertices are connected by an edge of the dual complex form, and if the two de vertices are associated with sequential indices. Examples of incident de vertices that are connected by edges of the dual complex form are illustrated in FIG. 7B. Sequential indices are illustrated by the index numbers for the curve points in FIGS. 5A and 5B.

---
Surface Patch Growth Algorithm
---
Input:
Source de vertex, $S_{de}$
User selected metric (e.g., surface area, normal variation, unit cost)
Step 1: Initialization
  Associate $S_{de}$ with cost 0, all other de vertices with cost = infinity
  Associate each de vertex with a predecessor pointer
  Initialize each predecessor pointer as empty
  Initialize minimal priority queue pq with $S_{de}$, whose key is the cost
Step 2: Recursively progress through pq until empty
  $top_{de}$ ← pop the top de vertex from pq
  for each incident de vertex $inc_{de}$ of $top_{de}$ do
    if $inc_{de}$ is not in $top_{de}$ then   { de vertex has not been visited}
      associate the cost as $top_{de}$.cost + cost($top_{de}$, $inc_{de}$)
      insert $inc_{de}$ into pq
      set $inc_{de}$.predecessor = $top_{de}$
    else
      if $top_{de}$.cost + cost($top_{de}$, $inc_{de}$) < $inc_{de}$.cost then
        update $inc_{de}$.cost, adjust its position in pq
        set $inc_{de}$.predecessor = $top_{de}$
      end if
    end if
  end for
end for
Step 3: Process all of the de vertices that are pushed into pq according to step 2. Follow the predecessor pointers to grow the surface patches.
---

To avoid fold back in the generated surface patches, patch generator 204 may execute the above patch growth algorithm independently for different configurations of surface patch growth. The configurations may be differentiated by the manner in which the sequential indices of the curve points increase or decrease as a surface patch is grown by adding incident de vertices in a particular direction along the curves. For example, as a surface patch is grown along two curves, curve indices for incident de vertices may increment along one curve and may decrement along the other curve. For example, in FIG. 5A, for a surface patch that originates at the leftmost edge (represented by indices i−4 and j+4) and progresses to the right, the indices of curve 0 increase (or, increment) and the indices of curve 1 decrease (or, decrement). Accordingly, this configuration for surface patch growth may be referred to as an inc-dec configuration, which may represent incident nodes for which index increments are paired with index decrements. Other patch growth configurations may be inc-inc (index increment paired with index increment), dec-dec (index decrement paired with index decrement), and dec-inc (index decrement paired with index increment). In some embodiments, inc-inc and dec-dec may be two directions for a complete bi-directional search from a de vertex.

In some embodiments, patch generator 204 may also prevent fold back in the generated surface patches by evaluating surface normals of incident de vertices. While growing a surface patch, patch generator 204 may have added a first de vertex to the surface patch. To further grow the surface patch, patch generator 204 may evaluate a second de vertex which is incident to the first de vertex to determine whether the second de vertex should be added to the surface patch. For example, the first de vertex and the second de vertex may form a face (e.g., a portion of a surface patch), which may have an associated surface normal. Patch generator 204 may determine a second normal that is based on the direction in which the surface patch is being grown. Patch generator 204 may avoid fold back in the surface patch by adding the second de vertex to the surface patch only if the surface normal and the direction normal point to the same direction. In some embodiments, patch generator 204 may evaluate the sign of the dot product of the two normals to determine whether the normals point in the same direction.

As described above, patch generator 204 may grow surface patches from each de vertex to each other de vertex. However, searching in four directions (inc-inc, inc-dec, dec-dec, and dec-inc) for each de vertex may be computationally expensive. Accordingly, patch generator 204 may reduce computational expense by making several observations for a surface patch which connects $curve_i$ and $curve_j$. If the surface patch configuration is inc-inc, patch generator 204 may be able to search rightward for surface patch growth, as opposed to bi-directionally, if the search is started at the leftmost de vertex for the two curves. Similarly, patch generator 204 may be able to start the surface patch growth from the rightmost de vertex and only have search leftward by following a dec-dec index pattern. A similar observation may apply to apply to inc-dec and dec-inc configurations. For example, a surface patch may be grown in a rightward direction if the search is begun at a leftmost de vertex of an inc-dec configuration. As another example, a surface patch may be grown in a leftward direction if the search is begun at a rightmost de vertex of a dec-inc configuration.

To take advantage of these observations in order to reduce computational expense, patch generator 204 may sort the de vertices to reduce the search direction to two cases: inc-inc and inc-dec. Patch generator 204 may represent each de vertex as {$curve_i$, $curve_j$, $index_x$, $index_y$}, where $index_x$ may be the index on $curve_i$, and $index_y$ may be the index on $curve_j$. The de vertices may be sorted into two different lists using two different methods. One sorted list of de vertices may be used to grow surface patches using the inc-inc configuration. The other sorted list of de vertices may be used to grow surface patches using the inc-dec configuration. The de vertices may be sorted based on the alphabetical increasing ordering of $curve_i$, $curve_j$, $index_x$, and $index_y$ for the inc-inc configuration surface patch growth. The de vertices may be sorted based on the alphabetical increasing order of $curve_i$, $curve_j$, $index_x$, and the decreasing ordering of $index_y$ for the inc-dec configuration surface patch growth. Sorting in this manner may ensure that the leftmost de vertex is the starting point for each surface patch growth, both in the inc-inc configuration and the inc-dec configuration. The patch growth algorithm illustrated above may be executed on both the inc-inc sorted list of de vertices and the inc-dec sorted list of de vertices to grow surface patches for a set of 3D curves. The circular increase of indices for closed curves, as illustrated in FIG. 5B, may be a limitation for these surface patch growth methods. To deal with this limitation, patch generator 204 may perform post processing on surface patches generated for closed curves. The post processing may merge such surface patches bi-directionally, incident with index 0 on the closed curves.

Surface patches for a set of 3D curves may be grown by proceeding through all de vertices and growing patches bidirectionally from each de vertex. However, this method may create redundant surface patch growth in a case where two de vertices create the same set of patches, or in a case where one set of patches is a subset of another set of patches. For example, $de_1$ may represent the leftmost de vertex in FIG. 7B, and $de_2$ may represent a de vertex that is visited during an inc-inc surface patch growth starting from $de_1$ in FIG. 7B. There may be no need to start an inc-inc search from $de_2$, because all of the valid incident searched patches may already be included in the surface patch generated from $de_1$. Accordingly, patch generator 204 may maintain an active list for all of the de vertices from which surface patches should be grown. Patch generator 204 may initialize the active list with all of the de vertices that represent the set of 3D curves. Patch generator 204 may select a de vertex from the list to grow a surface patch. A de vertex that is selected from the list to begin a surface patch growth may be removed from the active list. In addition, each de vertex that is added to a surface patch may also be removed from the active list. This method may reduce computational expense by decreasing the amount of de vertices from which surface patches growth can be originated and by reducing the number of redundant surface patches that are grown by patch generator 204.

The surface patch growth process may create a collection of large surface patches, some of which may be fully contained within one another. The surface patches which are contained within other surface patches may be referred to as sub-patches. Patch generator 204 may remove the sub-patches from the collection of patches, as the sub-patches may be duplicate representations of the 3D surface. Patch generator 204 may remove the sub-patches by examining the range of indices spanned by each surface patch to locate surface patches that are redundant. For example, patch generator 204 may locate sub-patches which have duplicate indices that are included in other surface patches. Patch generator 204 may remove the sub-patches with duplicate indices from the set of surface patches.

Figure 9:
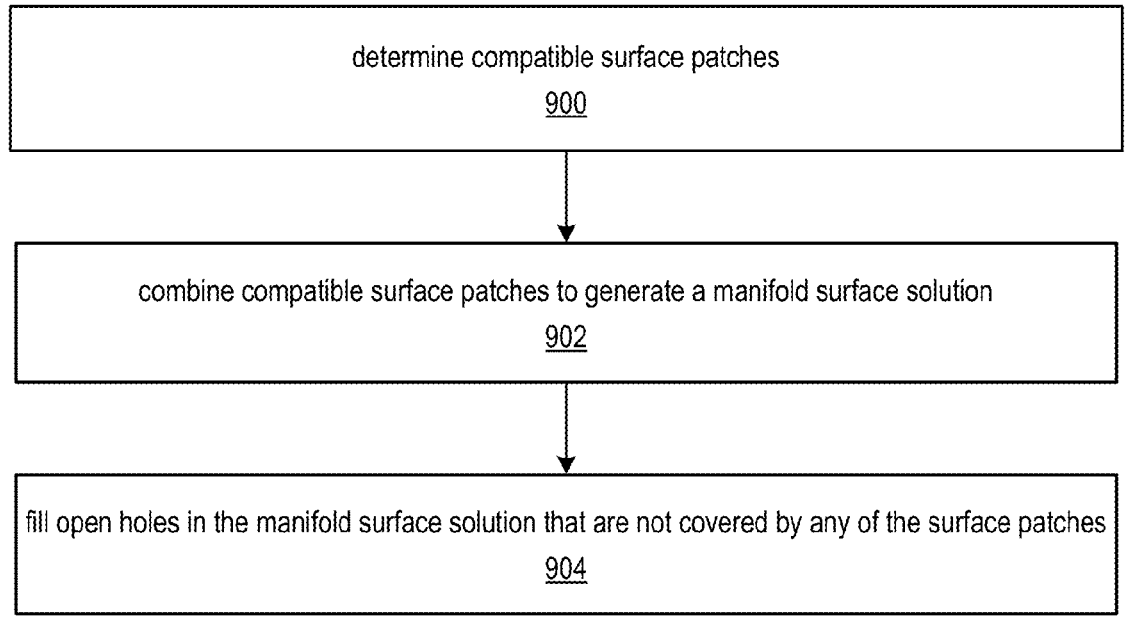
FIG. 9 illustrates an example method that may be used to combine compatible surface patches to form a manifold surface, according to some embodiments.

Subsequent to the removal of the sub-patches, patch combination module 206 may join compatible surface patches to create a manifold surface solution. FIG. 9 illustrates a method that may be implemented by patch combination module 206 to combine compatible surface patches to form a manifold surface. As indicated at 900, the method illustrated in FIG. 9 may include determining compatible surface patches. As described above, each surface patch may include a collection of connected triangles, or tetrahedron faces generated by the Delaunay tetrahedralization. The surface patch formed by the triangles may also be referred to as a skeletal sleeve. The skeletal sleeve may represent a strip, or portion, of the manifold surface. The medial axis transform along each of the formed 3D surface patches, or skeletal sleeves, may be non-branching.

Patch combination module 206 may join the surface patches to form a complete manifold surface which defines the shape of the 3D object represented by the set of 3D curves. Note that not all of the generated surface patches may be compatible with one another. The compatibility of two surface patches may depend on various criteria. For example, two overlapping surface patches may be incompatible if the two surface patches violate one or more curve capacity constraints in the overlap region. More specifically, if a capacity constraint for a curve specifies that the curve should have a surface adjacent to only one side, then two surface patches cannot be joined on more than one side of the curve. As another example two surface patches may be incompatible if the surface patches violate winding order constraints that a specified for a manifold surface. Joining incompatible surface patches may result in violations of curve capacity constraints or violations of winding order. Accordingly, patch combination module 206 may determine compatible surface patches which satisfy curve capacity constraints and winding order constraints. Such compatible surface patches may be joined by patch combination module 206 to generate one or more manifold surface solutions.

Figure 10A:
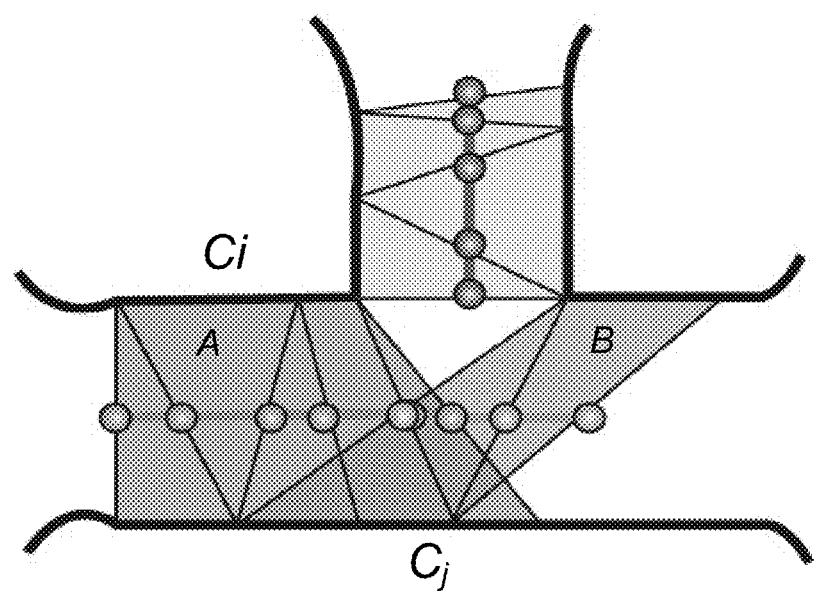
FIGS. 10A and 10B illustrate examples of incompatible surface patches, according to some embodiments.

FIG. 10A illustrates an example of two surface patches that are incompatible because the surface patches violate a capacity constraint for a 3D curve. Curve $C_j$ in FIG. 10A may have a curve capacity value of one. The curve capacity value of one for curve $C_j$ may indicate that curve $C_j$ may have a surface passing through the curve on only one side of curve. Two different surface patches are illustrated in FIG. 10A as patch A and patch B. As illustrated in FIG. 10A, patch A and patch B are incompatible because they violate the curve capacity constraint of curve $C_j$.

Figure 10B:
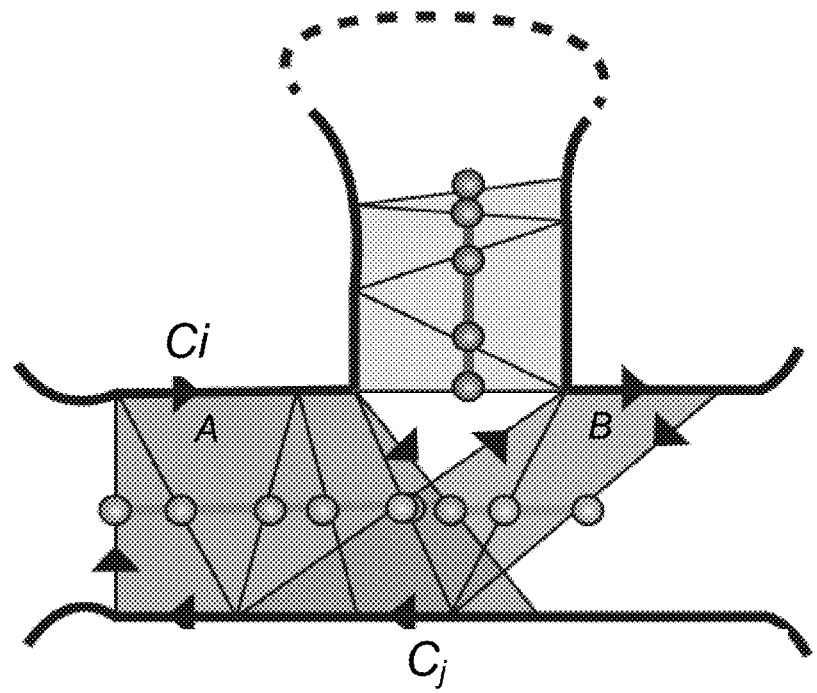

Surface patches may also be incompatible because the surface patches violate a winding constraint. A manifold surface may have winding constraints which specify a winding order, or a normal direction, for surface patch that is valid for the manifold surface. FIG. 10B illustrates an example of surface patches that are incompatible because the two patches violate a winding constraint. FIG. 10B illustrates two surface patches, patch A and patch B. The winding order, or normal direction, of each patch is illustrated by the arrows along the edges of the surface patches. As shown in FIG. 10B, both patch A and patch B have a clockwise winding order. FIG. 10B also illustrates curve $C_j$, which may have a capacity constraint value of two. The winding constraint for a curve with a capacity value of two may specify that both surfaces that are adjacent to the curve have winding orders that move in different, or opposite, directions. Since the winding orders for patch A and patch B are the same (e.g., clockwise, as illustrated in FIG. 10B), the patches violate the winding constraint for curve $C_j$. Therefore, patch A and patch B, as illustrated in FIG. 10B are incompatible surface patches.

Figure 11A:
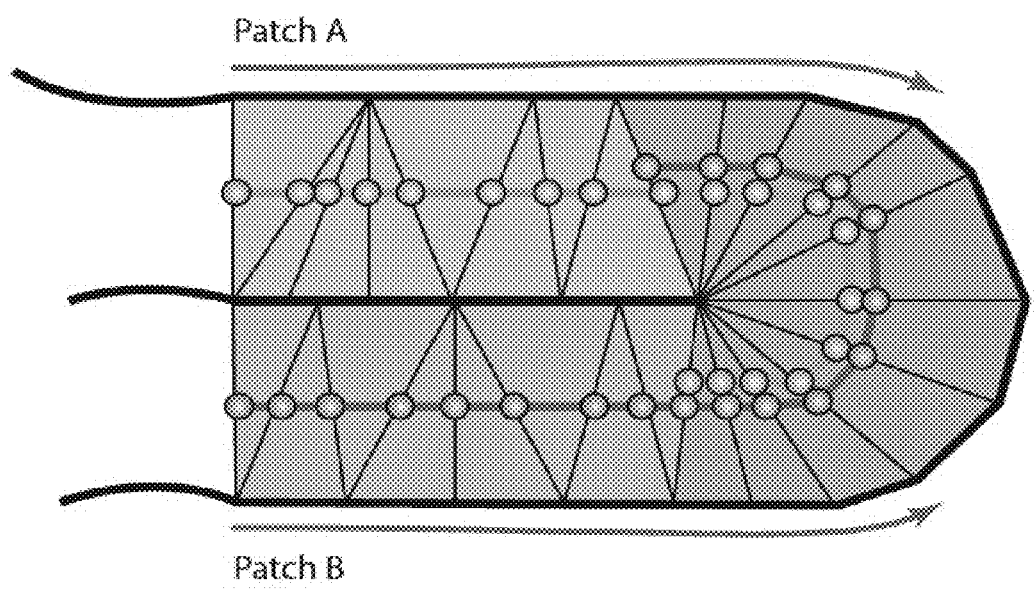
FIGS. 11A and 11B illustrate examples of compatible surface patches whose curve regions overlap, according to some embodiments.

FIG. 11A illustrates examples of compatible surface patches whose curve regions overlap. Patch A and Patch B illustrated in FIG. 11A are compatible, overlapping surface patches. Patch combination module may evaluate all generated surface patches against curve capacity constraints and winding order constraints to determine which surface patches are compatible. Note that in other embodiments, constraints other than, or in addition to, curve capacity constraints and winding order constraints may be used to determine whether surface patches are compatible. To represent compatible surface patches, patch combination module 206 may generate a compatibility graph in which each vertex of the graph may represent a surface patch. Connections between vertices on the graph may indicate that the surface patches represented by the connected vertices are mutually compatible with one another.

As indicated at 902, the method illustrated in FIG. 9 may include combining compatible surface patches to generate a manifold surface solution. For example, patch combination module 206 may join all surface patches which patch combination module 206 has determined are compatible. Patch combination module 206 may use the patch compatibility graph as a reference which specifies compatible surface patches. For example, patch combination module 206 may combine all of the surface patches which are indicated as compatible surface patches in the compatibility graph.

Figure 11B:
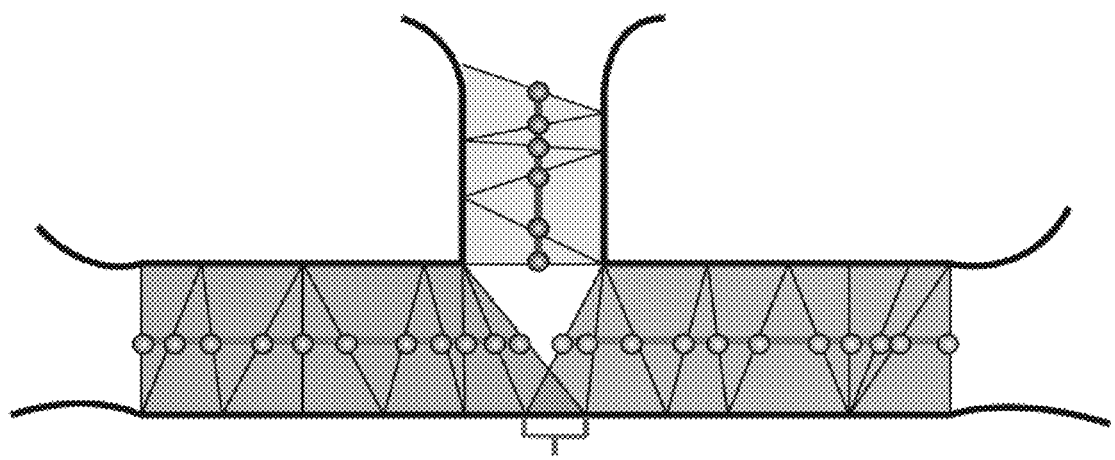

The manifold surface formed by joining the compatible surface patches may have holes in regions where multiple surface patches are joined together. Such regions may be referred to as joints. FIG. 11B illustrates an example scenario in which three surface patches meet at a joint. As illustrated in FIG. 11B, a hole may exist at the joint at which the surface patches meet. The hole may be a surface region that is not completely covered by the surface patches. As indicated at 904, the method illustrated in FIG. 9 may include filling open holes in the manifold surface solution that are not covered by the surface patches. For example, the manifold surface generator may fill open holes that exist at joints where multiple surface patches meet.

Open holes in the manifold surface may exist in regions where the surface patches connect, which may be at joints at which the medial axis transform branches. Holes may also be introduced by removing triangles of surface patches that exist in overlap regions at which surface patches are in conflict.

FIG. 12A illustrates an example of compatible surface patches which are in conflict within the region in which the surface patches overlap. The overlap region for the two compatible surface patches illustrated in FIG. 12A may be eliminated by removing a few triangles that are part of the triangle fans at the end of the patches. Joint triangles generated by the Delaunay tetrahedralization may be triangles for which all three edges are internal edges. A triangle edge may be considered an internal edge if the edge is not part of any curve in the set of 3D curves. The four innermost triangles in the conflict region illustrated in FIG. 12A are examples of joint triangles. Joint triangles may exist at regions at which the Delaunay tetrahedralization jumps curves or contiguous curve regions, as illustrated in FIG. 12A. Such joint triangles, since they include only internal edges, may not contribute to the overall manifold surface. Accordingly, the triangles may be removed from the surface patches to remove conflict regions. FIG. 12B illustrates an example of removing joint triangles to resolve a conflict region between surface patches. As illustrated in FIG. 12B, the four innermost triangles in the conflict region in FIG. 12A have been removed from the surface patches. Removing such joint triangles may create an open hole between surface patches, as illustrated in FIG. 12B.

Manifold surface generator 200 may fill open holes that exist between surface patches. For example, surface generator 200 may collect all of the open patch edges (e.g., edges at the end of each surface patch). Each surface patch, as described above, may have an associated winding order. Surface generator 200 may construct a directed graph dependent on the collected surface patch edges and the winding order for each surface patch. A directed cycle in the graph may indicate a hole in the surface that may be filled. Each hole that is detected from the directed graph may be considered to be a new closed curve, or a hole curve.

Figure 13:
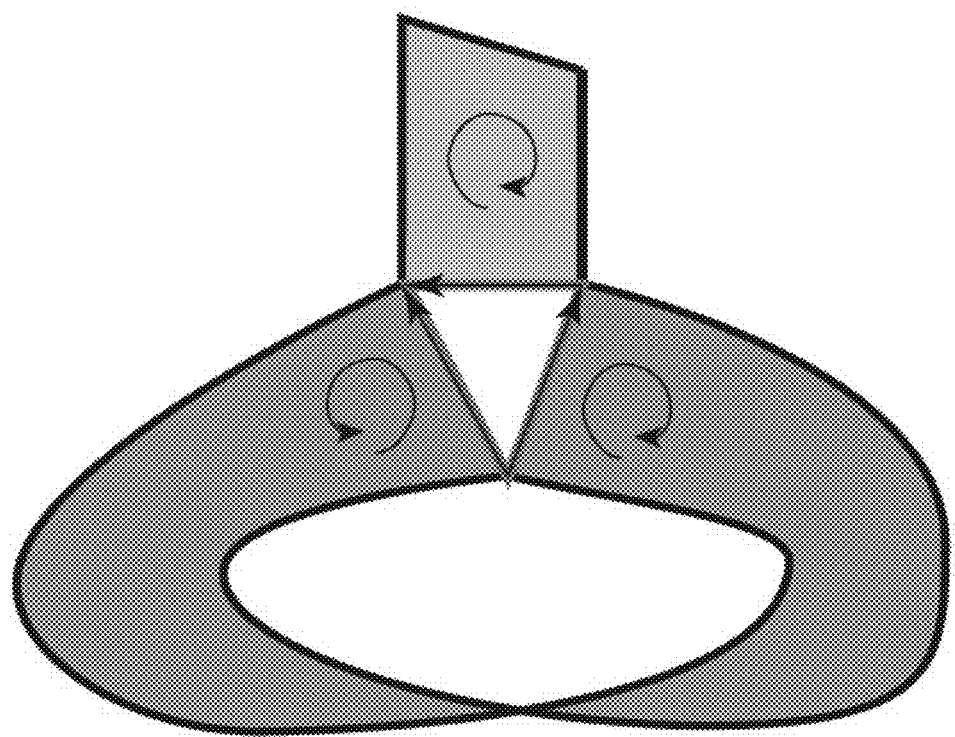
FIG. 13 illustrates an example curves which represent a twist in a surface that creates a hole which may not be filled, according to some embodiments.

Manifold surface generator 200 may assign indices to hole curves and may repeat the execution of the surface patch growth algorithm, as described above, to fill the hole regions that are represented by the hole curves. Note that execution of the surface patch growth algorithm may be repeated within computing a new Delaunay tetrahedralization. FIG. 12C illustrates an example of generating new closed curves to fill the open hole region illustrated in FIG. 12B. FIG. 12C illustrates two new closed curves which have been generated for the open hole region. As shown in FIG. 12C, indices have been generated for each of the new closed curves. Note that not all open holes that exist between surface patches are capable of being filled due to the winding order constraints of the surface patches. As an example, FIG. 13 illustrates curves which represent a twist in a surface that creates a hole which may not be filled. The arrows of FIG. 13 illustrate the respective winding order constraint of each of the closed curves. While the surface patches for the three curves are mutually compatible, it may not be possible to generate new closed curves within the hole region between the surface patches that satisfy the winding order constraints of the surface patches. Accordingly, the hole illustrated in FIG. 13 may not be filled.

Manifold Surface Completion

Manifold surface generator 200 may find compatible clusters of surface patches which may lead to a complete manifold surface solution. Manifold surface generator 200 may generate a polygonal mesh which may represent a manifold surface solution. In some embodiments, surface generator 200 may employ a user-guided method to generate the polygonal mesh. In other embodiments, surface generator 200 may employ an automatic method to generate the polygonal mesh. For both the user-guided method and the automatic method, surface generator 200 may use a compatibility graph to generate the polygonal mesh. For example, for each surface patch, manifold surface generator 200 may create a vertex in the compatibility graph. For each pair of compatible surface patches, manifold surface generator 200 may connect vertices in the graph which represent the compatible surface patches. Each line between connected vertices in the compatibility graph may represent an edge of the polygonal mesh.

When executing the user-guided method to generate the polygonal mesh, manifold surface generator 200 may allow the user to evaluate through the set of surface patches, which may be sorted from largest to smallest. The user may select surface patches which may be added to a manifold surface solution. Once a surface patch has been added to the manifold surface, any other surface patch that is incompatible with the manifold surface may be removed from the set of surface patches. The user may select surface patches to be added to the manifold surface until all surface patches in the set of surface patches have either been selected or removed from the set.

After the user has selected all available surface patches, manifold surface generator 200 may then fill holes which exist between the joined surface patches in the manifold surface. Surface generator 200 may execute a hole filling process similar to that described above. For example, surface generator 200 may examine the holes in the manifold surface and, based on the examination, may select holes which are capable of being filled. Such holes may be used to generate an additional set of surface patches that may be added to the set of surface patches. Surface generator 200 may iteratively execute this process to form a complete manifold surface solution. As described above, not all holes in a surface may be capable of being filled. For example, as illustrated in FIG. 13, a hole in a twist of a surface may not be filled due to incompatible winding constraints. In such cases, a user may decide to repeat the process of generating a manifold surface by selecting a different set of surface patches. The new set of surface patches may generate a manifold surface with fewer holes that cannot be filled.

In other embodiments, manifold surface generator 200 may execute an automatic method to generate the polygonal mesh which represents a manifold surface solution. Note that clusters of vertices in the compatibility graph may represent large collections of surface patches that are mutually compatible. Each cluster may represent a set of surface patches that may lead to a potential manifold surface solution. Conventional methods for locating clusters in the compatibility graph may be NP-hard, and, thus, may be computationally expensive. For example, the amount of computational run time that may be required to enumerate the clusters may be exponentially related to the number of vertices on the compatibility graph. Similarly, the problem of determining a single maximal cluster may also be NP-hard.

The size of the compatibility graph may be small, such that the number of vertices on the compatibility graph may be limited in number. As a result, manifold surface generator 200 may run a brute force exponential algorithm which may use the largest surface patches to automatically generate a set of clusters. For the set of generated clusters, manifold surface generator 200 may execute a hole filling process, similar to described above, to fill holes that exist between surface patches. Subsequent to filling all holes that may be filled, surface generator 200 may generate multiple manifold surface solutions. Similarly as described above, surface generator 200 may generate a polygonal mesh, from a cluster on the compatibility graph, that represents a manifold surface solution. Surface generator 200 may generate multiple manifold surface solutions which may satisfy different criteria, such as minimal surface area or minimal bending. Surface generator 200 may display the various manifold surface solutions to the user. The display may include an indication of the criteria used to create each particular manifold surface solution. Surface generator 200 may enable the user to select one or more of the manifold surface solutions which meet the user's desired implementation of a 3D model for the object.

Note that the methods described herein may have application in constructing manifold surfaces from curves in higher dimensions, and, thus, are not limited only to 3D curves. Also note that the methods described herein may not tessellate Mobeus strip regions due to orientation.

Example System

Figure 14:
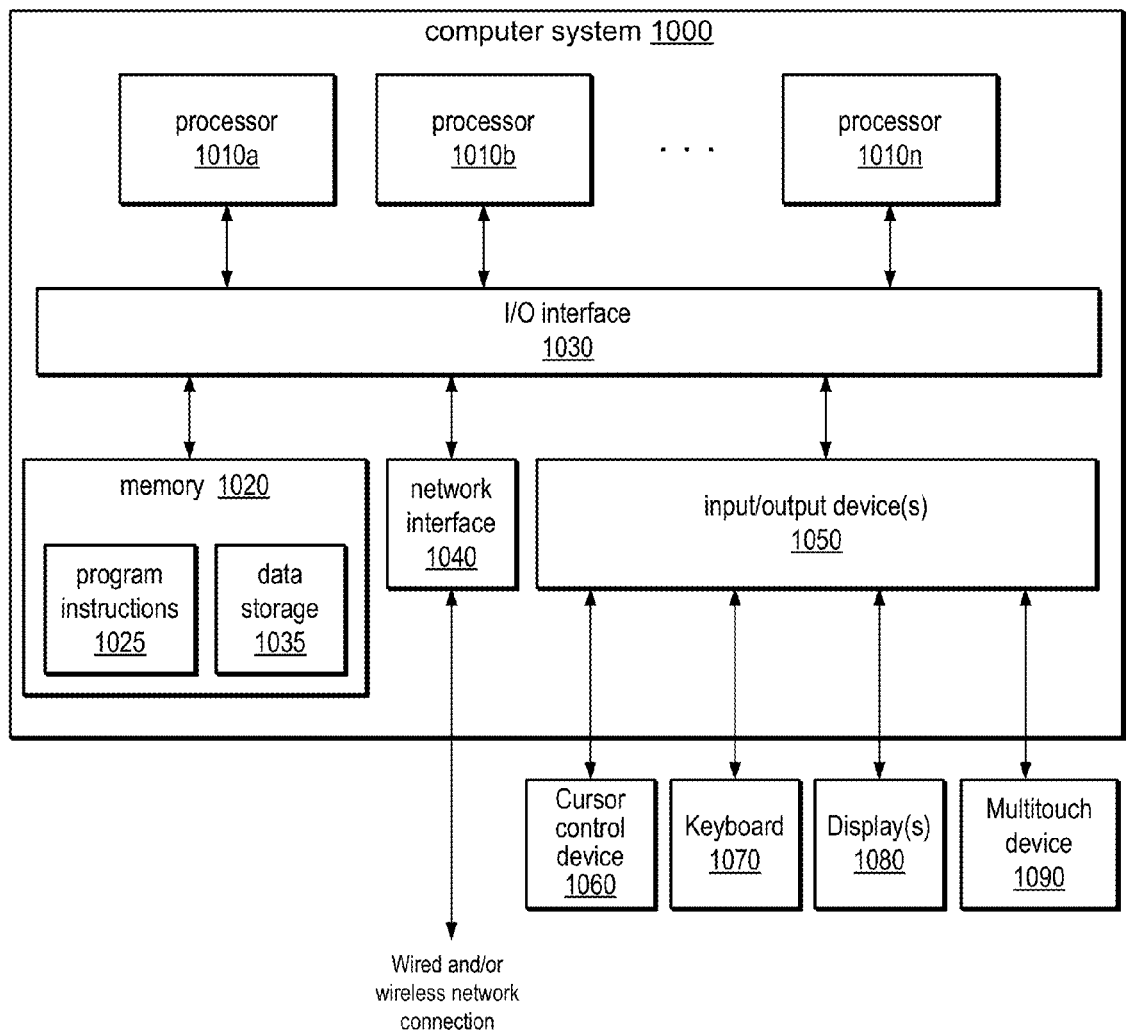
FIG. 14 illustrates an example computer system suitable for implementing various components of the system and method for generating a manifold surface for a 3D model of an object from a set of 3D curves which define the shape of the object.

Various components of embodiments of methods as illustrated and described in the accompanying description may be executed on one or more computer systems, which may interact with various other devices. One such computer system is illustrated by FIG. 14. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, multitouch device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods as illustrated and described in the accompanying description may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those for methods as illustrated and described in the accompanying description, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 14, memory 1020 may include program instructions 1025, configured to implement embodiments of methods as illustrated and described in the accompanying description, and data storage 1035, comprising various data accessible by program instructions 1025. In one embodiment, program instruction 1025 may include software elements of methods as illustrated and described in the accompanying description. Data storage 1035 may include data that may be used in embodiments. In other embodiments, other or different software elements and/or data may be included.

Those skilled in the art will appreciate that computer system 1000 is merely illustrative and is not intended to limit the scope of methods as illustrated and described in the accompanying description. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method comprising:
   receiving a plurality of three-dimensional (3D) curves which define a shape of an object;
   determining a capacity value for each of the plurality of 3D curves, the capacity value indicating a number of sides of the respective 3D curve that is adjacent to a surface of the object;
   generating, in a 3D domain, a tessellation which represents the plurality of 3D curves;
   generating, dependent on the tessellation and one or more metrics, a plurality of manifold surface solutions, each one of the plurality of manifold surface solutions representing a different potential surface for a 3D model of the object and satisfying the capacity value for each of the plurality of 3D curves; and
   displaying a representation of at least one of the plurality of manifold surface solutions.

2. The method of claim 1, wherein the plurality of 3D curves are non-intersecting curves, wherein the plurality of 3D curves comprises open and closed 3D curves, and wherein the capacity value is less than or equal to two.

3. The method of claim 1, wherein the tessellation forms a surface that connects the plurality of 3D curves, wherein the surface comprises the plurality of manifold surface solutions, wherein the tessellation is a Delaunay tetrahedralization and wherein generating the Delaunay tetrahedralization reduces a number of potential manifold surface solutions.

4. The method of claim 3, wherein said generating the plurality of manifold surface solutions comprises generating a plurality of surface patches.

5. The method of claim 4, wherein said generating the plurality of surface patches comprises:
   generating a first 3D dual complex form from the Delaunay tetrahedralization;
   generating a second 3D dual complex form from a plurality of faces for the first 3D dual complex form; and
   generating the plurality of surface patches dependent on the second 3D dual complex form and the one or more metrics, wherein a number of the plurality of surface patches that are generated is dependent on the one or more metrics.

6. The method of claim 4, wherein said generating each one of the plurality of manifold surface solutions further comprises:
   determining which ones of the plurality of surface patches are compatible with other ones of the plurality of surface patches;
   combining compatible ones of the plurality of surface patches to generate a respective manifold surface solution; and
   filling open holes in the respective manifold surface solution.

7. The method of claim 1, wherein the one or more metrics comprise a distance measure between connected vertices for the tessellation.

8. A non-transitory computer-readable storage medium storing program instructions that, responsive to execution, directs a computer to perform operations comprising:
   receiving a plurality of three-dimensional (3D) curves which define a shape of an object;
   determining a capacity value for each of the plurality of 3D curves;
   generating, in a 3D domain, a tessellation which represents the plurality of 3D curves;
   generating, dependent on the tessellation and one or more metrics, a plurality of manifold surface solutions, each one of the plurality of manifold surface solutions representing a different potential surface for a 3D model of the object and satisfying the capacity value for each of the plurality of 3D curves; and
   displaying a representation of at least one of the plurality of manifold surface solutions.

9. The non-transitory medium of claim 8, wherein the plurality of 3D curves are non-intersecting curves, wherein the plurality of 3D curves comprises open and closed 3D curves, and wherein the capacity value is less than or equal to two.

10. The non-transitory medium of claim 8, wherein the tessellation forms a surface that connects the plurality of 3D curves, wherein the surface comprises the plurality of manifold surface solutions, and wherein the tessellation is a Delaunay tetrahedralization.

11. The non-transitory medium of claim 10, wherein said generating the plurality of manifold surface solutions comprises generating a plurality of surface patches.

12. The non-transitory medium of claim 11, wherein said generating the plurality of surface patches comprises:
   generating a first 3D dual complex form from the Delaunay tetrahedralization;
   generating a second 3D dual complex form from a plurality of faces for the first 3D dual complex form; and
   generating the plurality of surface patches dependent on the second 3D dual complex form and the one or more metrics, wherein a number of the plurality of surface patches that are generated is dependent on the one or more metrics.

13. The non-transitory medium of claim 11, wherein said generating each one of the plurality of manifold surface solutions further comprises:
   determining which ones of the plurality of surface patches are compatible with other ones of the plurality of surface patches;
   combining compatible ones of the plurality of surface patches to generate a respective manifold surface solution; and
   filling open holes in the respective manifold surface solution.

14. The non-transitory medium of claim 8, wherein the one or more metrics comprise a distance measure between connected vertices for the tessellation.

15. A system comprising:
   a memory;
   one or more processors coupled to the memory; and
   a manifold surface generator stored in the memory and executable by the one or more processors to perform operations comprising:
      receiving a plurality of three-dimensional (3D) curves which define a shape of an object;
      generating, in a 3D domain, a Delaunay tetrahedralization which represents the plurality of 3D curves;
      reducing a set of tetrahedron faces resultant from the Delaunay tetrahedralization;
      generating, dependent on the reduced set of tetrahedron faces and one or more metrics, a plurality of manifold surface solutions, each one of the plurality of manifold surface solutions representing a different potential surface for a 3D model of the object; and
      displaying a representation of at least one of the plurality of manifold surface solutions.

16. The system of claim 15, wherein the plurality of 3D curves are non-intersecting curves, wherein the plurality of 3D curves comprises open and closed 3D curves, and wherein each one of the plurality of 3D curves has a capacity value that indicates whether a surface of the object is adjacent to one or two sides of the respective 3D curve.

17. The system of claim 15, wherein the tessellation forms a surface that connects the plurality of 3D curves and wherein the surface comprises the plurality of manifold surface solutions.

18. The system of claim 17, wherein said generating the plurality of manifold surface solutions comprises generating a plurality of surface patches, and wherein said generating the plurality of surface patches comprises:
   generating a first 3D dual complex form from the Delaunay tetrahedralization;
   generating a second 3D dual complex form from a plurality of faces for the first 3D dual complex form; and
   generating the plurality of surface patches dependent on the second 3D dual complex form and the one or more metrics, wherein a number of the plurality of surface patches that are generated is dependent on the one or more metrics.

19. The system of claim 17, wherein generating at least one of the plurality of manifold surface solutions further comprises:
   combining compatible ones of the plurality of surface patches to generate a respective manifold surface solution; and
   filling open holes in the respective manifold surface solution.

20. The system of claim 15, wherein the one or more metrics comprise a distance measure between connected vertices for the tessellation.

* * * * *